United States Patent
Tourapis

(10) Patent No.: US 9,538,176 B2
(45) Date of Patent: Jan. 3, 2017

(54) PRE-PROCESSING FOR BITDEPTH AND COLOR FORMAT SCALABLE VIDEO CODING

(75) Inventor: Alexandros Tourapis, Milpitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 760 days.

(21) Appl. No.: 14/004,326

(22) PCT Filed: Mar. 8, 2012

(86) PCT No.: PCT/US2012/028368
§ 371 (c)(1),
(2), (4) Date: Sep. 10, 2013

(87) PCT Pub. No.: WO2012/122423
PCT Pub. Date: Sep. 13, 2012

(65) Prior Publication Data
US 2014/0003528 A1    Jan. 2, 2014

Related U.S. Application Data

(60) Provisional application No. 61/451,551, filed on Mar. 10, 2011.

(51) Int. Cl.
| H04N 19/80 | (2014.01) |
| H04N 19/30 | (2014.01) |
| H04N 19/134 | (2014.01) |
| H04N 19/117 | (2014.01) |
| H04N 19/187 | (2014.01) |

(Continued)

(52) U.S. Cl.
CPC ...... *H04N 19/00424* (2013.01); *H04N 19/117* (2014.11); *H04N 19/134* (2014.11); *H04N 19/187* (2014.11); *H04N 19/30* (2014.11); *H04N 19/33* (2014.11); *H04N 19/80* (2014.11); *H04N 19/85* (2014.11)

(58) Field of Classification Search
None
See application file for complete search history.

(56) References Cited

U.S. PATENT DOCUMENTS

| 8,229,159 B2 | 7/2012 | Tourapis |
| 2005/0078755 A1 | 4/2005 | Woods |

(Continued)

FOREIGN PATENT DOCUMENTS

| EP | 2 144 444 | 1/2010 |
| WO | 2006/128072 | 11/2006 |

(Continued)

OTHER PUBLICATIONS

Park, J.H. et al. "Requirement of SVC Color Space Scalability" JVT Meeting, MPEG meeting, Oct. 21-26, 2007.

(Continued)

*Primary Examiner* — Geepy Pe
*Assistant Examiner* — Janese Duley

(57) ABSTRACT

Methods for scalable video coding are described. Such methods can be used to deliver video contents in Low Dynamic Range (LDR) and/or one color format and then converting the video contents to High Dynamic Range (HDR) and/or a different color format, respectively, while pre-processing video content.

14 Claims, 15 Drawing Sheets

(51) Int. Cl.
H04N 19/33 (2014.01)
H04N 19/85 (2014.01)

(56) References Cited

U.S. PATENT DOCUMENTS

| | | | |
|---|---|---|---|
| 2006/0222079 A1* | 10/2006 | Park | H04N 21/21805 375/240.16 |
| 2006/0268166 A1 | 11/2006 | Bossen | |
| 2007/0201560 A1 | 8/2007 | Segall | |
| 2008/0013630 A1 | 1/2008 | Li | |
| 2008/0137990 A1* | 6/2008 | Ward | H04N 19/30 382/299 |
| 2009/0097561 A1 | 4/2009 | Chiu | |
| 2009/0285283 A1 | 11/2009 | Gao | |
| 2009/0323808 A1* | 12/2009 | Lin | H04N 19/139 375/240.16 |
| 2010/0027678 A1* | 2/2010 | Alfonso | H04N 21/23432 375/240.21 |
| 2010/0165077 A1* | 7/2010 | Yin | H04N 19/597 348/42 |
| 2011/0090959 A1 | 4/2011 | Wiegand | |
| 2011/0103473 A1 | 5/2011 | Li | |
| 2011/0142132 A1 | 6/2011 | Tourapis | |
| 2012/0092452 A1 | 4/2012 | Tourapis | |
| 2013/0163666 A1 | 6/2013 | Leontaris | |

FOREIGN PATENT DOCUMENTS

| | | |
|---|---|---|
| WO | 2007/002437 | 1/2007 |
| WO | 2008/128898 | 10/2008 |
| WO | 2010/123855 | 10/2010 |

OTHER PUBLICATIONS

Segall, A. et al. "System for Bit-Depth Scalable Coding" JVT Meeting Apr. 21-27, 2007, JVT-W113.
Liu, S. et al. "SVC Inter-Layer Pred for SVC Bit-Depth Scalability" JVT Meeting, MPEG Meeting Jun. 30, 2007, JVT of ISO/IEC JTC1.
Wu, Y. et al. "Bit-Depth Scalibility Compatible to H.264/AVC Scalable Extension" Journal of Visual Communication and Image Representation, vol. 19, No. 6, Aug. 1, 2008.
Segall A. et al. "Tone Mapping SEI Message: New Results", JVT Meeting MPEG Meeting; Oct. 17, 2006.
Song, Byung Cheol et al. "Motion-Compensated Temporal Pre-Filtering for Noise Reduction in a Video Encoder", Image Processing, International Conference on Singapore, Oct. 24-27, 2004, Piscataway, NJ, vol. 2, pp. 1221-1224.
Lee, Young et al. "An Adaptive Image Bit-Depth Scaling Method for Image Displays" IEEE Transactions on Consumer Electronics, vol. 53, No. 1, Feb. 1, 2010, pp. 141-146.
Lim, Suk Hwan, et al. "Denoising Scheme for Realistic Digital Photos from Unknown Sources" Acoustics, Speech and Signal Processing, 2009, IEEE International Conference on IEEE, Piscataway, NJ, Apr. 19, 2009, pp. 1189-1192.
Tourapis, Alexis Michael et al. "A Frame Compatible System for 3D Delivery", MPEG Meeting, Jul. 2010, Geneva, Motion Picture Expert Group or ISO/IEC JTC1/SC29, p. 6.
Vatis, Y. et al. "Two-dimensional non-separable Adaptive Wiener Interpolation Filter for H.264/AVC," ITU-T SGI 6/Q.6 Doc. VCEG-Z17, Busan, South Korea, Apr. 2005.
Ostermann, J. et al. "Motion compensated prediction with 1/8-pel displacement vector resolution," ITU-T SG16/Q.6 Doc. VCEG-AD09, Hangzhou, China, Oct. 2006.
Vatis, Y. et al., "Prediction of P- and B-Frames Using a Two-dimensional Non-separable Adaptive Wiener Interpolation Filter for H.264/AVC," ITU-T SG16/Q.6 Doc. VCEG-AD08, Hangzhou, China, Oct. 2006.
Vatis, Y. et al. "Comparison of Complexity between Two-dimensional non-separable Adaptive Interpolation Filter and Standard Wiener Filter," ITU-T SG16/Q.6 Doc. VCEG-AA11, Nice, France, Oct. 2005.

T. Wedi, "Complexity reduced motion compensated prediction with 1/8-pel displacement vector resoltution," ITU-T Q.6/SG16, doc. VCEG-L20, Eibsee, Germany, Jan. 2001.
T. Wedi, "1/8-pel motion vector resolution for H.26L," ITU-T Q.15/SG16, doc. Q15-K-21, Portland, Oregon USA, Aug. 2000.
Barnsley, M.F. et al., Fractal Image Compression, AK Peters, Ltd., Wellesley, 1993.
Lu, N. Fractal Imaging, Academic Press, USA, 1997.
Narroschke, M. et al. "Adaptive prediction error coding in spatial and frequency domain with a fixed scan in the spatial domain," ITU-T SG16/Q.6 Doc. VCEG-AD07, Hangzhou, China, Oct. 2006.
Schwarz, H. et al. "Overview of the Scalable Extension of the H.264/MPEG-4 AVC Video Coding Standard" IEEE Transactions on Circuits and Systems for Video Technology, vol. 17, No. 9, Sep. 1, 2007, pp. 1103-1120.
Winken, M. et al. "Bit-Depth Scalable Video Coding" IEEE International Conference on Image Processing, Sep. 1, 2007, pp. 1-5-1-8.
Wu, Y. et al. "Inter-layer Prediction in Bit-Depth Scalability", JVT Meeting, MPEG Meeting No. JVT-X052, Jul. 4, 2007.
Smolic, A. et al. "Coding Algorithms for 3DTV—A Survey", in IEEE Transactions on Circuits and Systems for Video Technology, vol. 17, No. 11, pp. 1606-1621, Nov. 2007.
Winken, M. et al. "SVC Bit Depth Scalability", Joint Video Team, Doc. JVT-V078, Marrakech, Morocco, Jan. 2007.
Barnsley, M.F. et al. "Fractal Image Compression" AK Peters Ltd., Wellesley, 1993.
Lu, N. "Fractal Imaging" Academic Press, USA 1997.
ITU-T Rec. H.262 "Generic Coding of Moving Pictures and Associated Audio Information" Part 2: Video, ITU-T Rec. H.262 and ISO/IEC 13818-2 (MPEG-2 Video), ITU-T and ISO/IEC JTC 1, Nov. 1994.
ITU-T "Advanced Video Coding for Generic Audiovisual Services" ITU-T Rec. H.264 and ISO/IEC 14496-10 (MPEG-4 AVC), ITU-T and ISO/IEC JTC 1, Version 1: May 2003, Version 2: May 2004, Version 3: Mar. 2005, Version 4: Sep. 2005, Version 5 and Version 6: Jun. 2006, Version 7: Apr. 2007, Version 8 (including SVC extension): Consented in Jul. 2007.
Sullivan G. et al. "Text of ISO/IEC 14496 10 Advanced Video Coding 3rd Edition", ISO/IEC JTC 1/SC 29/WG11 N6540. doc, Jul. 4, 2004.
Wiegand, T. et al. Joint Draft 11 of SVC Amendment, Joint Video Team, Doc. JVT X201, Jul. 2007.
Lim, K. P. et al. "Text Description of Joint Model Reference Encoding Methods and Decoding Concealment Methods", ISO/IEC JTC 1/SC 29/WG11 JVT-R095, doc. Jan. 17, 2004.
Smolic A. et al. "3-D video and free viewpoint video-technologies, applications and MPEG standards," in Proc. IEEE ICME, Toronto, ON, Canada, Jul. 2006, pp. 2161-2164.
Smolic A. et al. "3DAV exploration of video-based rendering technology in MPEG," IEEE Trans. Circuits Syst. Video Technol., vol. 14, No. 3, pp. 348-356, Mar. 2004.
Merkle P. et al. "Efficient compression of multiview video exploiting inter-view dependencies based on H.264/MPEG4-AVC," in Proc. ICME 2006 IEEE Int. Conf. on Multimedia and Expo, Toronto, Ontario, Canada, Jul. 2006.
Muller K. et al. "Multi-view video coding based on H.264/AVC Using Hierarchical b-frames," in Proc. PCS 2006, Picture Coding Symp., Beijing, China, Apr. 2006.
Merkle P. et al. "Efficient prediction structures for multiview video coding," in IEEE Transactions on Circuits and Systems for Video Technology, vol. 17, No. 11, pp. 1461-1473, Nov. 2007.
Smolic, K. et al. "Coding Algorithms for 3DTV—A Survey," in IEEE Transactions on Circuits and Systems for Video Technology, vol. 17, No. 11, pp. 1606-1621, Nov. 2007.
Sullivan, G.J. et al., "Rate-Distortion Optimized Motion Compensation for Video Compression Using Fixed or Variable Size Blocks", Proc. GLOBECOM '91, 1991, pp. 85-90.
Sullivan, G.J. et al., "Rate-distortion optimization for methods for video compression," IEEE Signal Processing Magazine, vol. 15, pp. 74-90, Nov. 1998.
Ortega, A. et al., "Rate-distortion methods for image and video compression," IEEE Signal Processing Magazine, vol. 15, pp. 23-50, Nov. 1998.

(56) References Cited

OTHER PUBLICATIONS

JVT reference software version JM13.2, 2011 http://iphome.hhi.de/suehring/tml/download/.
Weber Fechner Law, http://www.reference.com/browse/wiki/Weber-Fechner_Law.
Stanley S. Stevens, "On the psychophysical law", Psychology Review, 64(3):153-181 (1957).
Stevens' Power Law http://en.wikipedia.org/wiki/Stevens'_power_law.
Cheong, H.Y. et al. "Adaptive Spatio-Temporal Filtering for Video De-Noising," Proceedings of the 2004 IEEE International Conference on Image Processing (ICIP'04), Oct. 2004.
Sullivan, G.J. "Adaptive quantization encoding technique using an equal expected-value rule," Hong Kong JVT meeting contribution JVT-N011, Jan. 2005.
Tourapis, A.M. et al., "H.264/MPEG-4 AVC Reference Software Enhancements," Hong Kong JVT meeting contribution JVT-N014, Jan. 2005.
Gao, Y. et al. "Applications and Requirement for Color Bit Depth Scalability," Joint Video Team, Doc. JVT-U049, Hangzhou, China, Oct. 2006.
Gao, Y. et al. "AHG Report: SVC bit depth and chroma format," Joint Video Team, Doc. JVT-V014, Marrakech, Morocco, Jan. 2007.
Gao, Y. et al. "Bit depth scalability," Joint Video Team, Doc. JVT-V061, Marrakech, Morocco, Jan. 2007.
Winken, M. et al. "SVC bit depth scalability," Joint Video Team, Doc. JVT-V078, Marrakech, Morocco, Jan. 2007.
Mantiuk R. et al., "Perception-motivated High Dynamic Range Video Encoding," in Proc. of SIGGRAPH '04 (Special issue of ACM Transactions on Graphics), 2004.
Mantiuk R. et al., "Backward Compatible High Dynamic Range MPEG Video Compression," in Proc. of SIGGRAPH '06 (Special issue of ACM Transactions on Graphics), 25 (3), pp. 713-723, 2006.
Mantiuk R. et al., "High Dynamic Range Image and Video Compression—Fidelity Matching Human Visual Performance," in Proc. of IEEE International Conference on Image Processing Sep. 1, 2007, pp. 9-12.
Ward, G. et al., "JPEG-HDR: A Backwards-Compatible, High Dynamic Range Extension to JPEG," Proceedings of the Thirteenth Color Imaging Conference, Nov. 2005.
Ward, G. "A General Approach to Backwards-Compatible Delivery of High Dynamic Range Images and Video," Proceedings of the Fourteenth Color Imaging Conference, Nov. 2006.
Tourapis, A.M. et al. "Reduced resolution update mode extension to the H.264 standard," in Proceedings of the IEEE International Conference on Image Processing (ICIP'05, pp. 910-913.
Gao, Y. et al., "AHG Report: SVC bit depth and chroma format," Joint Video Team, Doc. JVT-W010, San Jose, CA, Apr. 2007.
Gao, Y. et al. "CE4: SVC bit-depth scalability simulation results," Joint Video Team, Doc JVT-W102, San Jose, CA, Apr. 2007.
Segall A. et al. "System for bit-depth scalable coding," Joint Video Team, Doc. JVT-W113, San Jose, CA, Apr. 2007.
Segall A. "CE4: Verif JVT-W102 (Thomson prop)," Joint Video Team, Doc. JVT-W116, San Jose, CA, Apr. 2007.
Gao, Y. et al. "Simulation Results for CE2: SVC Bit-depth Scalability," Joint Video Team, JVT-X051, Geneva, Switzerland, Jun. 2007.
Wu, Y. et al. "Study on Inter-layer Prediction in Bit-Depth Scalability," Joint Video Team, JVT-X052, Geneva, Switzerland, Jun. 2007.
Winken, M. et al., "CE2: SVC bit-depth scalability," Joint Video Team, JVT-X057, Geneva, Switzerland, Jun. 2007.
Segall, A. et al. "CE2: Inter-layer Prediction for Bit-Depth Scalable Coding," Joint Video Team, JVT-X067, Geneva, Switzerland, Jun. 2007.
Liu, S. et al., "Inter-layer Prediction for SVC Bit-Depth Scalable Coding," Joint Video Team, JVT-X075, Geneva, Switzerland, Jun. 2007.
Ye, Y. et al., "Improvements to Bit Depth Scalability Coding," Joint Video Team, JVT-Y048, Shenzhen, China, Oct. 2007.
Segall, A. "CE1: Bit-Depth Scalability," Joint Video Team, JVT-X301r1, Geneva, Switzerland, Jun. 2007.
Wu, F. et al. "Macroblock-based progressive fine granularity scalable video coding," in International Journal of Imaging Systems and Technology, special issue on Multimedia Content Description and Video Compression, vol. 13, No. 6, pp. 297-307, 2004.
Orchard, M. T. et al., "Overlapped block motion compensation: an estimation-theoretic approach," IEEE Trans. on Image Processing, vol. 3, No. 5, pp. 693-699, Sep. 1994.
Bourge, A. et al. "MPEG-C Part 3: Enabling the Introduction of Video Plus Depth Contents," 3D Workshop on Content generation and coding for 3D-television, Eindhoven, The Netherlands, Jun. 2006.
Schwarz, H. et al., "R-D optimized multilayer encoder control for SVC," in Proceedings of the IEEE International Conference on Image Processing (ICIP) 2007, San Antonio, TX, Sep. 2007.
Gsell, E. "Extended Bit Depth Characterization," ITU-T SG16 Q.6 Document JVT-L026, Jul. 2004.
Karczewicz, M. "Improved Intra Coding", ITU-T SG 16/06 Doc. VCEG-AF15, San Jose, CA, Apr. 2007.
Richardson, I. "H.264 Transform and Quantization," Online H.264 Tutorials.
Rusanovsky, D. et al. "Adaptive Interpolation with Directional Filters," ITU-T SG16/Q.6 Doc. VCEG-AG21, Shenzhen, China, Oct. 2007.

* cited by examiner

US 9,538,176 B2

PRE-PROCESSING FOR BITDEPTH AND COLOR FORMAT SCALABLE VIDEO CODING

CROSS REFERENCE TO RELATED APPLICATIONS

This application claims priority to U.S. Provisional Patent Application No. 61/451,551 filed Mar. 10, 2011, which is incorporated herein by reference in its entirety.

The present application may be related to International Patent Application No. US2006/020633, filed on May 25, 2006, International Patent Application No. US2006/024528, filed on Jun. 23, 2006, U.S. patent application Ser. No. 12/188,919, filed on Aug. 8, 2008, U.S. patent application Ser. No. 12/999,419, filed on Dec. 16, 2010, U.S. patent application Ser. No. 13/057,204, filed on Feb. 2, 2011, U.S. Provisional Patent Application No. 61/380,111, filed on Sep. 3, 2010, and U.S. Provisional Patent Application No. 61/223,027, filed on Jul. 4, 2009, all of which are incorporated herein by reference in their entirety. In addition, the present application may be related to U.S. Provisional Patent Application No. 61/451,536 filed on Mar. 10, 2011; U.S. Provisional Patent Application No. 61/451,541 filed on Mar. 10, 2011; and U.S. Provisional Patent Application No. 61/451,543 filed on Mar. 10, 2011, all of which are incorporated herein by reference in their entirety.

FIELD OF THE INVENTION

The present disclosure relates to scalable video coding. Moreover in particular, it relates to pre-processing for bit-depth and color format scalable video coding.

BACKGROUND OF THE INVENTION

Scalable video coding (SVC) is an extension of H.264/AVC, which was developed by the Joint Video Team (JVT). Enhanced content applications such as High Dynamic Range (HDR), Wide Color Gamut (WCG), spatial scalability, and 3-D have become widely popular. Along with popularity, systems and methods for delivering such content to current generation consumer set-top box decoders have become increasingly important. However, there are drawbacks in delivering such content in enhanced format. For instance, higher amounts of bandwidth may be involved in delivery of the content in enhanced format. Additionally, content providers may have to upgrade or replace their infrastructure in order to receive and/or deliver the content in enhanced format.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 13A shows an exemplary encoder system involving an enhancement layer pre-processing and synchronization between the enhancement layer and the base layer. FIG. 13B shows the exemplary encoder system of FIG. 13A with an additional, and optional, low-complexity base layer pre-processor.

DESCRIPTION OF EXAMPLE EMBODIMENTS

Figure 1A:
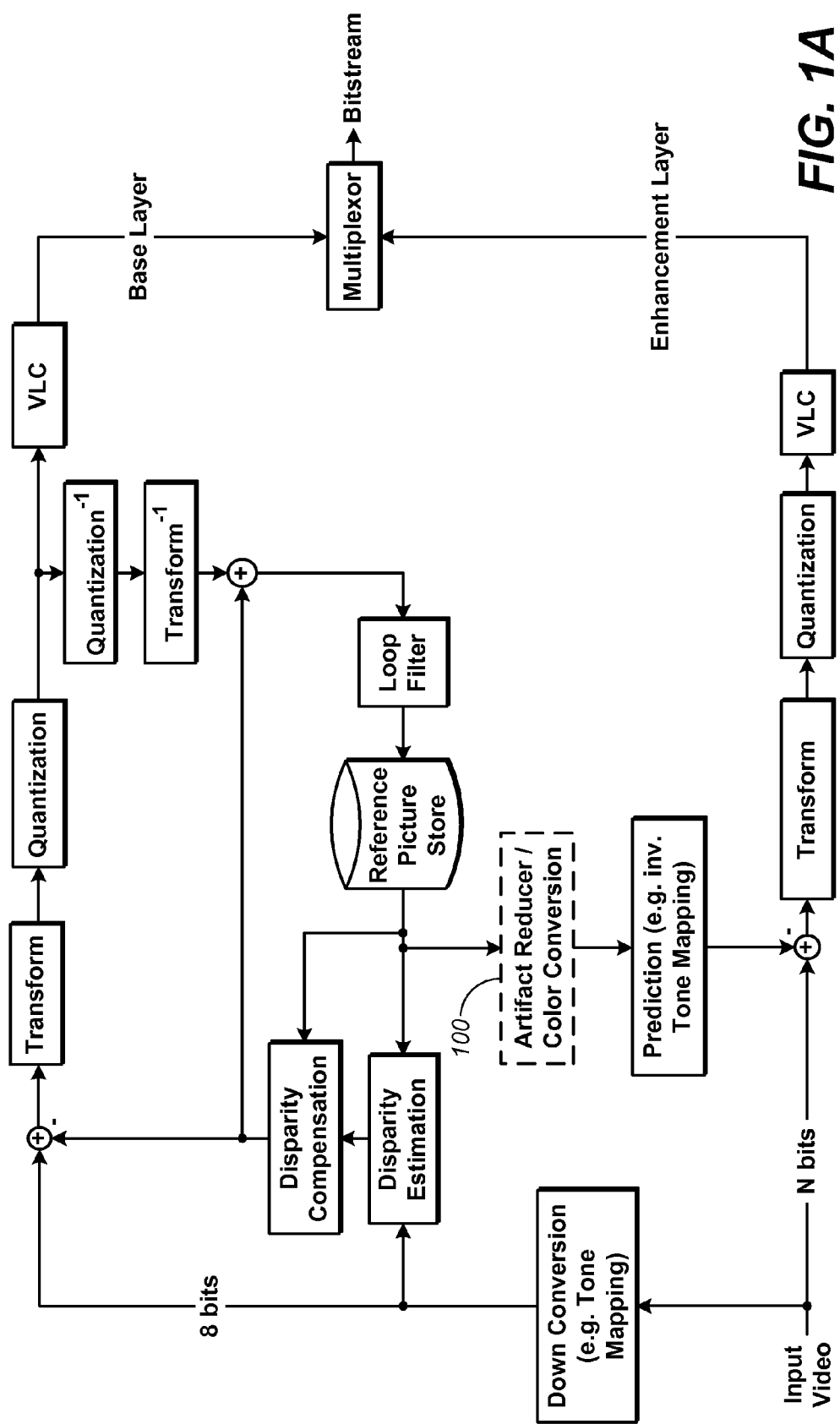
FIGS. 1A-1B show exemplary bit-depth and color format scalable encoders.

According to a first aspect, a method of mapping input video data from a first layer to a second layer is described, the method comprising: providing the input video data; providing a plurality of video blocks or macroblocks, each of the video blocks or macroblocks comprising a portion of the input video data; providing a plurality of prediction methods; selecting one or more prediction methods from among the plurality of prediction methods for each of the video blocks or macroblocks; and applying, for each video block or macroblock, the selected one or more prediction methods, wherein the applying maps the video data from the first layer to the second layer.

According to a second aspect, a method of mapping input video data from a first layer to a second layer is described, the method comprising: providing the input video data for the first layer, the input video data comprising input pictures; providing a plurality of reference pictures; selecting, for each input picture, one or more reference pictures from the plurality of reference pictures, wherein the selecting is a function of each reference picture in the plurality of reference pictures and the input picture; providing a plurality of prediction methods; selecting one or more prediction methods from the plurality of prediction methods for each reference picture; and applying, for each reference picture, the selected one or more prediction methods, wherein the applying maps the input video data from the first layer to the second layer.

According to a third aspect, a method of mapping input video data from a first layer to a second layer is described, the method comprising: providing the input video data for the first layer, the input video data comprising input pictures, wherein each input picture comprises at least one region; providing a plurality of reference pictures, wherein each reference picture comprises at least one region; selecting, for each region in each input picture, one or more reference pictures or regions thereof from the plurality of reference pictures, wherein the selecting is a function of each reference picture or region and each region in each input picture; providing a plurality of prediction methods; selecting one or more prediction methods from the plurality of prediction methods for each reference picture or region; and applying, for each reference picture or region, the selected one or more prediction methods, wherein the applying maps the input video data from the first layer to the second layer.

According to a fourth aspect, a method for optimizing distortion of video data is described, the method comprising: providing input video data comprising a base layer input picture to a base layer and an enhancement layer input picture to an enhancement layer; providing a base layer reference picture and an enhancement layer reference picture; computing a first distortion based on a difference between the base layer reference picture and the base layer input picture; computing a second distortion based on a difference between the enhancement layer reference picture and the enhancement layer input picture; and optimizing distortion of the video data by jointly considering the first distortion and the second distortion.

According to a fifth aspect, a method of processing input video data is described, the method comprising: providing a first layer and at least one second layer; providing the input video data to the first layer and the at least one second layer; pre-processing the input video data in the first layer and pre-processing the input video data in the at least one second layer, the pre-processing of the input video data in the first layer being performed synchronously with the pre-processing of the input video data in the at least one second layer; and encoding the pre-processed input video data in the first layer and the at least one second layer.

According to a sixth aspect, a method of processing input video data is described, the method comprising: providing a base layer and at least one enhancement layer; applying the input video data to the base layer and the at least one enhancement layer; and pre-processing the input video data at the at least one enhancement layer and applying the pre-processed input video data to the at least one enhancement layer and the base layer.

According to a seventh aspect, a system for removing information from video data before encoding is described, the system comprising: a base layer pre-processor connected to a base layer encoder; an enhancement layer pre-processor connected to an enhancement layer encoder; and a reference processing unit (RPU) connected between the base layer encoder and the enhancement layer encoder, wherein the base layer pre-processor and the enhancement layer pre-processor are adapted for pre-processing the video data such that the pre-processing removes information from the video data, and wherein the base layer pre-processor is adapted to operate synchronously with the enhancement layer pre-processor.

According to an eighth aspect, a system for removing information from video data before encoding is described, the system comprising: a base layer pre-processor connected to a base layer encoder; an enhancement layer pre-processor connected to an enhancement layer encoder, the enhancement layer pre-processor adapted to receive higher dynamic range video data; and a tone mapping unit connected between the base layer pre-processor and the enhancement layer pre-processor, the tone mapping unit is adapted to tone map pre-processed video data from the enhancement layer pre-processor to the base layer pre-processor.

A compatible delivery system involves creation of a scalable system which supports a legacy base layer (e.g., MPEG-2, H.264/AVC, and possibly VC1 or AVS) and additional enhancement layers with enhanced capabilities such as increased resolution, High Dynamic Range (HDR), Wide Color Gamut (WCG), and 3-D, among others. A compatible delivery system considers complexity, cost, time to market, flexibility, expandability, and compression efficiency.

An increase in complexity over existing consumer level devices can be a factor in designing a system for compatible delivery. In particular, certain constraints should be considered when designing algorithms for such applications so as to keep memory, power consumption, and processing within appropriate limits. These could be accomplished by considering the characteristics and interactions of both the base and enhancement layer codec designs, as well as, optionally, the characteristics of other associated information such as audio.

Similarly, it would be highly desirable if components from an existing system (e.g., inverse transform and quantization elements, deblocking, entropy decoding etc.) can be reused if available from the base layer, thus potentially reducing further implementation costs of such schemes.

Costs are generally related with complexity. Decoding both base and enhancement layer data using higher end devices can incur high costs, both implementation and computational. Furthermore, cost may also be affected by the amount of resources and time required for developing compatible delivery systems.

Flexibility and expandability are also generally considered in designing compatible delivery systems. More specifically, it is desirable for a compatible delivery system to provide support within for multiple different codecs as the base layer. These different codecs may include H.264/AVC as well as legacy codecs such as MPEG-2, VC-1, AVS, VP-6, VP-7, and VP-8 among others. Next Generation codecs, such as High Efficiency Video Codec (HEVC), may also be considered. Codecs can be designed in such a way as to fit, or exist within existing compatible delivery systems. In essence, this allows devices designed to support a particular compatible delivery system to also support decoding of a more optimized but single layer enhanced content bitstream without significant (if any) modifications.

Coding performance/compression efficiency can also be considered in designing compatible delivery systems. In an example illustrating coding performance/compression efficiency, consider the bitdepth scalable method of references [3][10], which extend the concepts used for spatial scalability in the context of the Scalable Video Coding extension of MPEG-4 AVC to also support bitdepth scalability. Instead of utilizing a dual loop decoding system (e.g., two decoders: one decoder for the base layer and a second decoder utilizing information of the base layer as well as its own information to decode the enhancement layer), a single decoder is utilized that adjusts its behavior depending on whether base layer decoding or enhancement layer decoding is expected. If base layer decoding is performed, then only the base layer bitstream information is decoded. Thus, a lower bitdepth image will be decoded. If enhancement layer decoding is performed, then some of the information from the base layer can be considered and decoded. The considered and decoded information, such as mode/motion information and/or residual information, can assist in the decoding of the enhancement layer and additional data. The image or residual data decoded from the base layer are used for prediction by directly up-converting base layer macroblocks using bit shifts or inverse tone mapping.

For inter pictures, motion compensation (110) was performed directly on higher bit-depth content, while a base layer residual (120) was also considered after appropriate conversion (e.g., bitdepth scaling or tone mapping), of the residual. An additional residual signal was also transmitted when this prediction method was used to avoid drift issues. A diagram of this method is presented in FIG. 1B.

Figure 1B:
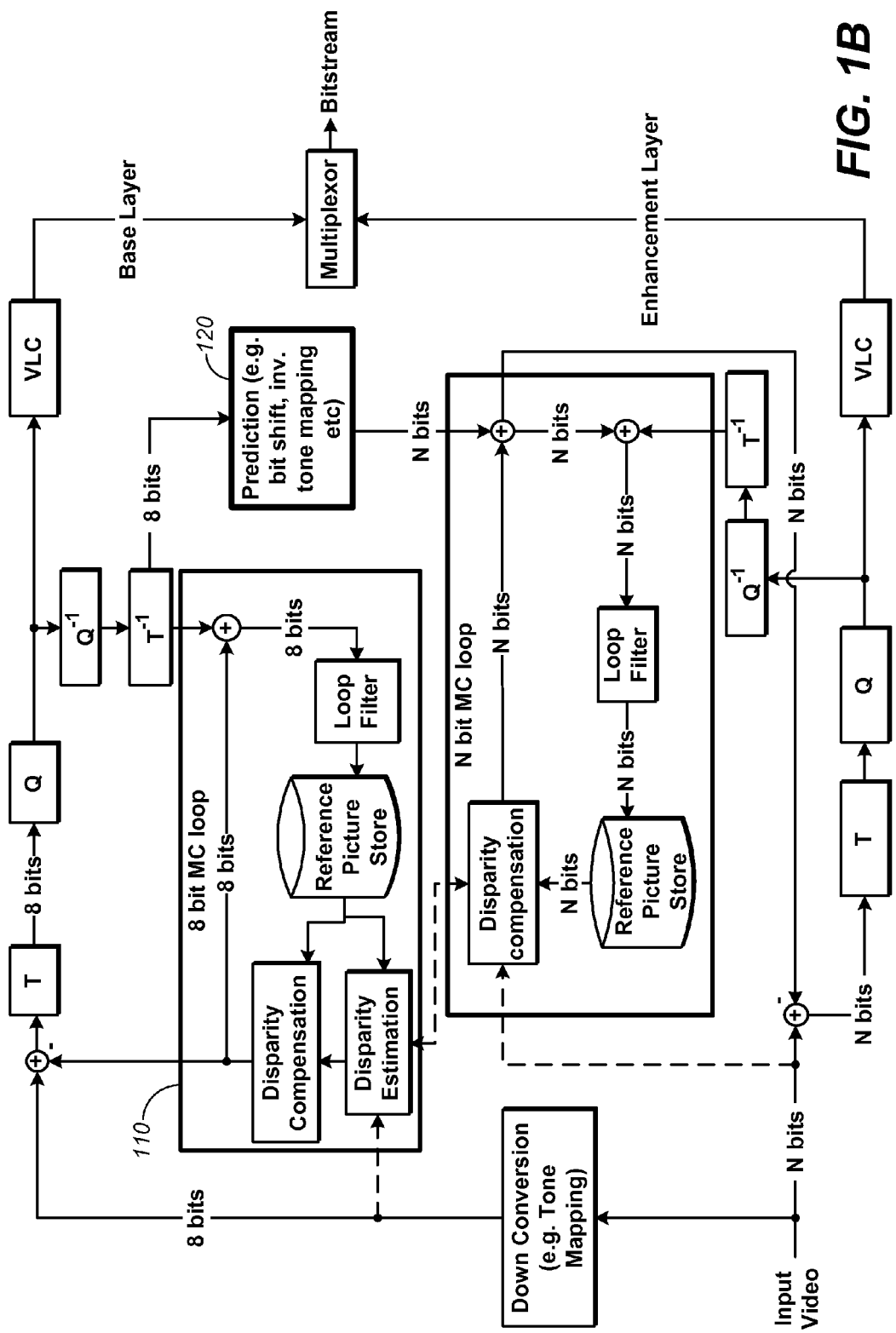

The bit-depth scalable method according to references [4] and [11], considered a particular method for performing bit-depth scalability. In this method, bit depth scalability was considered by always applying inverse tone mapping to a reconstructed base layer video. Color conversion (100) can be applied prior to considering any inverse tone mapping. In that scenario, inverse tone mapping information can be adjusted for all color components accordingly. On the other hand, it may be possible that encoding for High Dynamic Range (HDR) content and, more generally, content of different bit depth and/or color-format from the bit depth and color-format used for the base layer can remain in the same color space, commonly the YUV color space, and appropriate color conversion depending on the capabilities of a display are performed, given some color transform equation at a decoder. A diagram of this method is shown in FIG. 1A. In this method, motion compensation considers 8 bit samples. Therefore, existing implementations of H.264 decoders can still be used with minor modification, if any at all. The method resembles the Fine Granularity Scalability methods previously used in MPEG-4. A plurality of methods can be specified for the inverse tone mapping methods such as, for example, linear scaling and clipping, linear interpolation, look-up table mapping, color format conversion, Nth order polynomial, and splines. More specifically:

a) Linear scaling and clipping: the current sample predictor y with a bit depth of M is obtained from its corresponding sample x in the base layer which has a bit depth of N:

$$y = \min(2^{M-N}x, 2^M - 1)$$

b) Linear interpolation using an arbitrary number of interpolation points: for a low bit depth sample with value x and two given interpolation points $(x_n, y_n)$ and $(x_{n+1}, y_{n+1})$, with $x_n \leq x \leq x_{n+1}$, the corresponding prediction sample y with a bit depth of M is obtained as:

$$y = \min\left(y_n + \frac{x - x_n}{x_{n+1} - x_n}(y_{n+1} - y_n), 2^M - 1\right)$$

c) Look-up table mapping: for each possible low bit depth sample value, the corresponding high bit depth sample value is specified.

A similar approach was also presented in references [5] and [6]. Using the base layer, after performing a color space transform in logarithmic space and an appropriate inverse tone mapping process, a residual image was generated. This residual image was then filtered, quantized from a higher bit depth space to 8 bits, and the residual image was encoded using an MPEG-4 Advanced Simple Profile (ASP) encoder. One of the primary differences from other methods was that in this system, color space transform and log encoding were considered. Additionally, the enhancement layer was constrained to fit in 8 bits to allow the reuse of existing MPEG-4 ASP encoder and decoder implementations. Finally, this approach can also use other tools available within the MPEG-4 implementation such as inter prediction.

An enhancement of reference [11] was presented in reference [12] where weighting parameters were estimated at a macroblock level to better handle localized tone mapping. More specifically, scale s and offset o parameters for each color component can be predicted from the macroblocks above or to the left of the current macroblock, and are used in place of the inverse tone mapping information used in reference [11]. The scaling factor s and offset o can then be differentially and entropy encoded within the bitstream. Prediction y for the current sample x from the lower bit-depth image can be generated as y=s×x+o. This method retained the "8-bit only motion compensation" principle of the original method. A similar method was presented in reference [9]. This method was implemented in the context of reference [3] and considered a restricted weighted prediction process to predict samples in the higher bit-depth images from the base layer.

The methods presented in references [7] and [8] are also similar to the weighted prediction methods discussed in the previous paragraphs. Reference [7] proposed encoding a log encoded lower resolution ratio image with a Low Dynamic Range (LDR) 8 bit image, which was then used to reconstruct an image of higher dynamic range, such as an HDR image. This ratio image was encoded using basic image encoding methods (e.g., using the 8×8 DCT used in JPEG and quantization) instead of performing prediction as in reference [12]. On the other hand, an offset, unlike the previous method, was not considered while no other residual signals were provided. Using operations more appropriate for linear space samples such as transform and quantization in log encoded images may have some impact on performance.

Similar methods were used also in reference [8], but instead of encoding the ratio image, a lower resolution HDR image was encoded and signaled. Using full resolution LDR and lower resolution HDR information, a decoder is used to derive full resolution HDR images. However, such a process may involve additional processing at the decoder and does not fully exploit correlations that may exist between LDR and HDR images. This could therefore potentially degrade coding efficiency. Additionally, coding efficiency and quality can be further affected from the quantization parameters and coding decisions applied at either layer.

By examining the methods presented in the previous paragraphs, further enhancements can be made to better handle region based tone mapping. Specifically, the methods described in the present disclosure are based on either a single inverse tone mapping method as in reference [1] or a weighted prediction based method as in references [9] and [12]. A technique to extend such methods is to consider signaling of multiple inverse mapping tables or methods. More specifically, N (up to 16) inverse mapping mechanisms can be signaled simultaneously within the Sequence Parameter Sets (SPS) and/or Picture Parameter Sets (PPS), as well as within other mechanisms provided within a bitstream, such as the "reference processing unit (RPU)" as described in U.S. Provisional Patent Application No. 61/223,027. An SPS, for example, can be defined as a parameter set or coding unit comprising parameters to be applied to a video sequence, and a PPS can be defined as a parameter set or coding unit comprising parameters to be applied to one or more pictures within a sequence. An RPU can also provide signaling parameters at a similar level as the PPS, but needs not be associated with any particular codec design and can be more flexible on how information is processed or used.

Such inverse mapping process can also be extended for slice headers as well. For each block or macroblock, if more than one inverse tone mapping mechanism is allowed for coding a slice/picture, then a parameter is signaled to by a selector to select the inverse tone mapping method that is used for prediction.

Further details of some of the parameters can be found, for example in reference [4]. Extensions of the methods according to the present disclosure can be made to allow bi-prediction, which could allow for additional tone mapping considerations beyond those specified using a single prediction. That is, assuming N inverse mapping methods are signaled, then for every macroblock that is signaled, a prediction mode (e.g., single list prediction or bi-prediction) is also selected. If single list prediction is selected, then only one inverse mapping method is signaled. If bi-prediction is selected, then two inverse mapping methods are signaled. For the bi-prediction case, a final prediction is created as $y=(y_0+y_1+1)>>1$ where $y_0$ and $y_1$ correspond to predictions generated independently by the two inverse mapping methods. If weighted prediction is also used, the final prediction may be of the form $y=((a_0*y_0+a_1*y_1+2^{N-1})>>N)+o$.

In another embodiment of the present disclosure, the method described above can be extended with an addition of a "skip" type prediction mode, which determines the inverse mapping method based on neighbors of the macroblock to be predicted (e.g., majority vote or smallest index in neighborhood) without signaling residuals. Additionally, modes can be signaled separately from residuals to exploit entropy coding behavior. Determining a set of efficient inverse mapping parameters can have great impact on performance. Furthermore, macroblocks can be of any size. However, 8×8 blocks may be preferred over 16×16 blocks when consideration is given to existing microprocessors.

In an alternative embodiment of the present disclosure, adaptive inverse mapping (e.g., inverse tone mapping), tables can be considered. Similarly to the methods described in reference [12], when determining an inverse mapping method to be applied to a particular block or macroblock, neighboring macroblocks of the particular macroblock can be considered. However, instead of using neighboring macroblocks/blocks to determine weighting and offset parameters, sample values in the neighboring macroblocks are considered to update a default lookup table. All pixels in all neighbors can be considered if desired, although updating the default lookup table can consider the samples of the lines above and/or on the left only. The method can also be extended for use with multiple lookup tables as well. For example, a fixed table can be used initially. A copy of the initial table is also created. However, the created copy of the initial table is adaptive instead of fixed. For every macroblock that is encoded, the adaptive table is then updated with a true relationship between base and enhancement images. The bitstream can contain a signal on whether to use the fixed or adaptive tables (maps). Furthermore, a signal can be provided that resets the adaptive table to the initial table. Again, multiple tables can also be used.

Consideration of values within the neighboring macroblocks may be unnecessary and could possibly make optimization techniques more difficult (e.g., Trellis based decision of the weighting parameters and the quantization process of the remaining residual). Therefore, weighting parameters can be differentially encoded using the weighting parameters of the neighbors directly. That is, the weighting parameters of the left, top, and top-right macroblocks can be used to predict the weighting parameters of the current macroblock directly. For example, weight'=median(weight$_L$, weight$_T$, weight$_{TR}$) and offset'=median(offset$_L$, offset$_T$, offset$_{TR}$). This method can be combined with the multiple inverse tone mapping methods as described above, while deblocking can also be considered to reduce blockiness in an enhanced bit-depth image.

Weighting can also be used in combination with inverse mapping tables. Thus, instead of the weighting parameters being applied on the base layer samples directly, the weighting parameters are applied to the inverse mapped samples. The methods which consider just the base layer for prediction are more or less independent of the base layer codec. Note that similar considerations can be made for color parameters, or in predicting other color parameters using information from a first color parameter. In an example, given the method according to reference [12], and the method of the present disclosure, the weighting parameters for all components can be predicted separately, yet the same residual weighting parameters can be applied in all three components. In another example, assuming that an 8-bit YUV color space is being used where chroma components are normalized to around 128 and a weight a corresponds with the luma component, the weighted prediction for other components can be performed as described in U.S. Provisional Patent Application No. 61/380,111, where:

$$U'=\alpha \times U+128\times(1-\alpha)$$

$$V'=\alpha \times V+128\times(1-\alpha)$$

Figure 2:
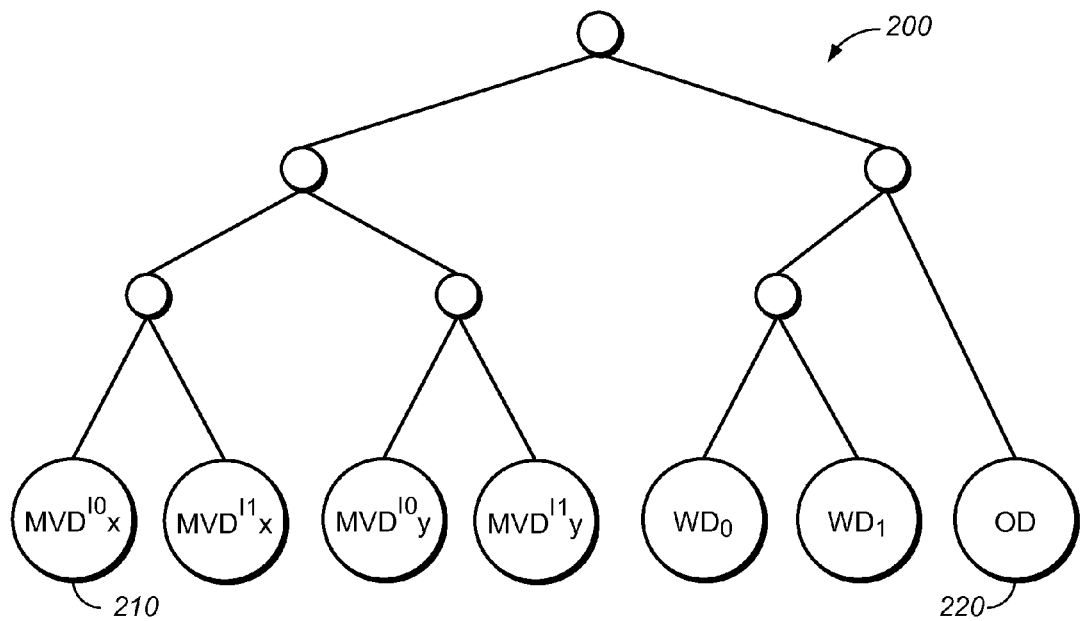
FIG. 2 shows an exemplary tree structure used for encoding a block or macroblock, where nodes of the tree structure denote motion and weighted prediction parameters.
Figure 3:
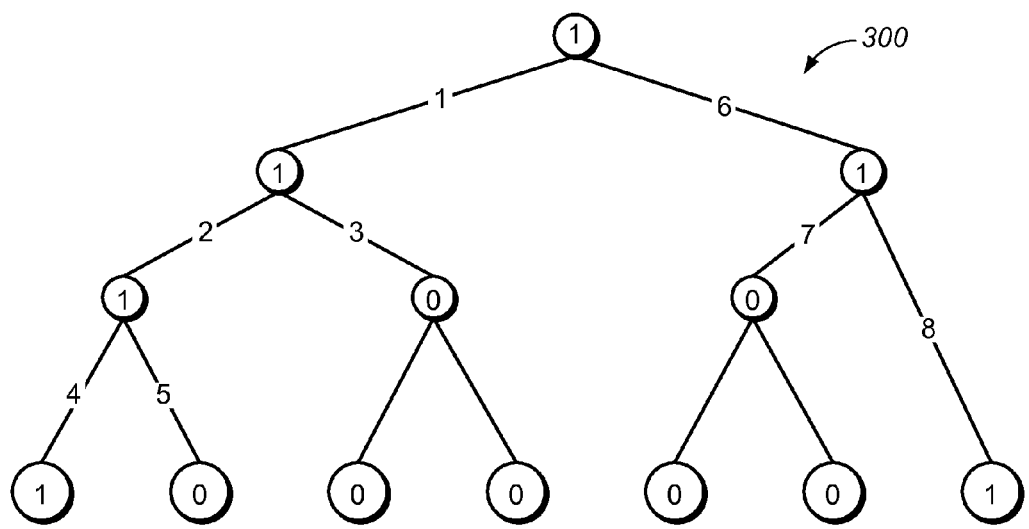
FIG. 3 shows the bit representation corresponding to the tree structure presented in FIG. 2.

As shown in reference [13], considering temporal prediction within the bit-depth scalability framework can be valuable. However, if prediction directly from the enhancement layer is not provided, then the methods described herein can be difficult for a single layer approach. Similarly to the methods presented for fine granularity scalability in reference [2], for each macroblock (e.g., block of size 8×8 or 16×16), use of different coding modes and/or motion information can be specified for prediction. Specifically, the following coding modes for a macroblock can be considered:

a) Base layer prediction using inverse mapping methods as described previously
b) Base layer prediction using inverse mapping while mapping is generated by considering relationships of base and enhancement motion compensated predictions
c) Base layer skip (no additional parameter signaling or residual)
d) Inter layer prediction directly from the enhancement layer using motion information from the base layer. Correction motion vector/weighting parameter information can also be signaled to permit encoding without the presence of a base layer
e) Inter layer skip mode where motion information can be derived from the base and/or from the enhancement layer
f) Bi-prediction using inverse mapped, e.g. inverse tone mapped, base layer and temporal prediction
g) Intra prediction from the enhancement layer
h) Combined intra prediction with inter and/or base layer prediction International Patent Application No. US2006/020633 describes an efficient scheme for coding mode and motion information based on a zero tree representation where prediction related parameters (e.g., motion vectors and weighting parameters) are differentially encoded given an easy to determine prediction (e.g., the values of the neighboring blocks). The differential parameters are then grouped together based on their relationships. For example, for a bi-predicted block, motion vectors can be grouped together based on their orientation or the list to which they belong, while weighting parameters belong in a different group. Signaling is then performed by examining which nodes contain non-zero values. For example, for the motion representation provided in the tree structure (200) of FIG. 2, if only $MVD^{l0}_x$ (210) (horizontal motion vector difference component of list0) and OD (220) (offset difference) are non-zero, then eight bits are needed to signal the representation (300) (FIG. 3) in addition to the values of $MVD^{l0}_x$ and OD. However, if only $MVD^{l0}_x$ is non-zero, then only six bits are needed to signal the representation.

Figure 4:
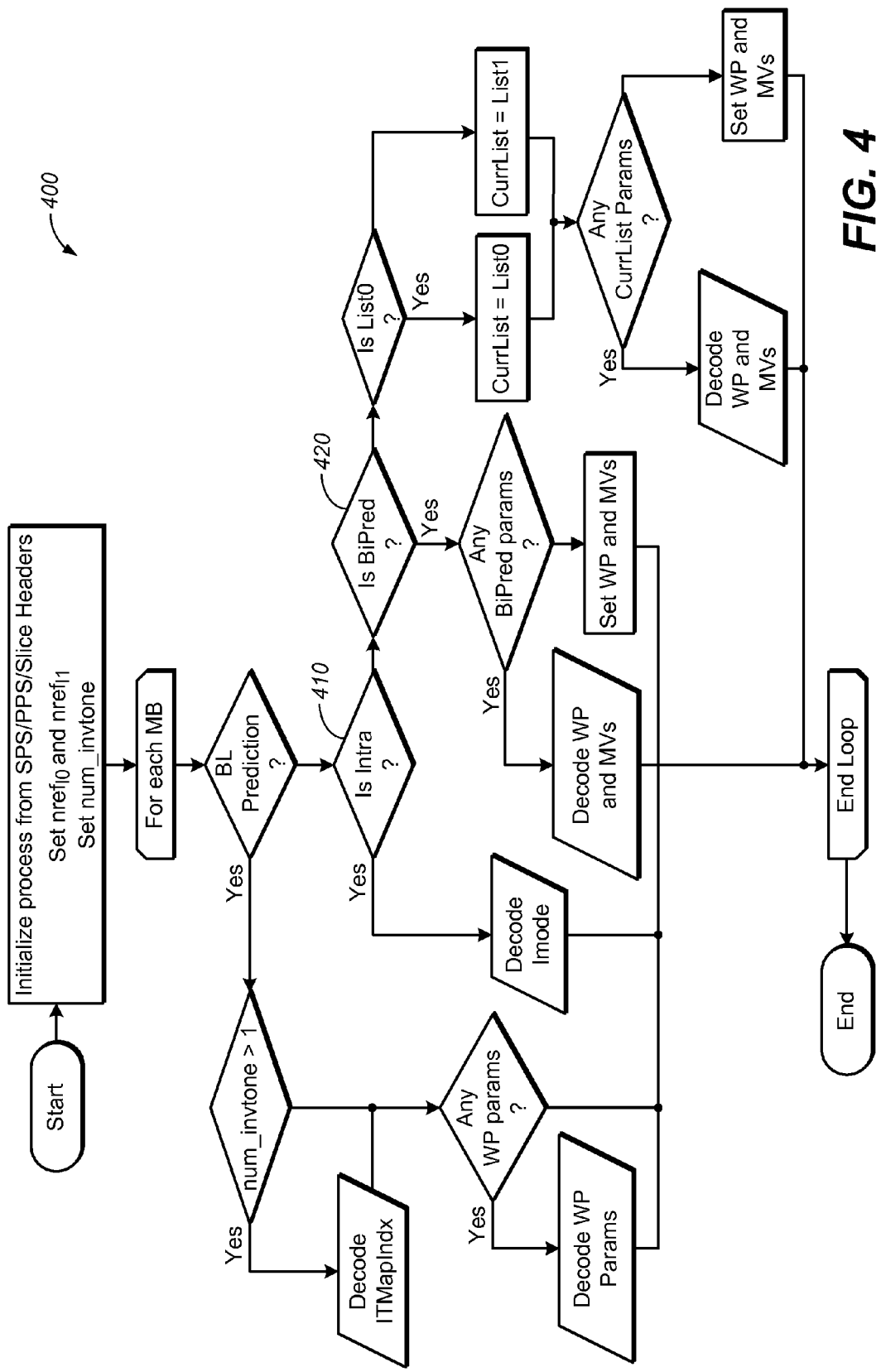
FIG. 4 shows an exemplary zero tree representation of a signaling process of the macroblock/block information in context of tone mapping/scalability.

A possible representation (400) for performing the signaling within the context of bit-depth scalability is presented in FIG. 4. A prediction mode order can be established through experimentation even if the mode order is needed. Furthermore, it is possible to define slice/picture types that consider one or a subset of modes. For example, a slice type can be defined to consider inverse mapping, e.g. tone mapping, prediction. Then, a different slice type can consider intra prediction (410), while a third slice type can consider intra, single list prediction, bi-prediction (420), or single list and inverse tone mapping prediction. Other combinations are also possible depending on whether or not coding advantages can be determined due to reduced overhead representation versus a generic method. Such coding types can also be useful in the case of single layer coding since inverse tone mapping would not be useful in such cases.

Figure 5:
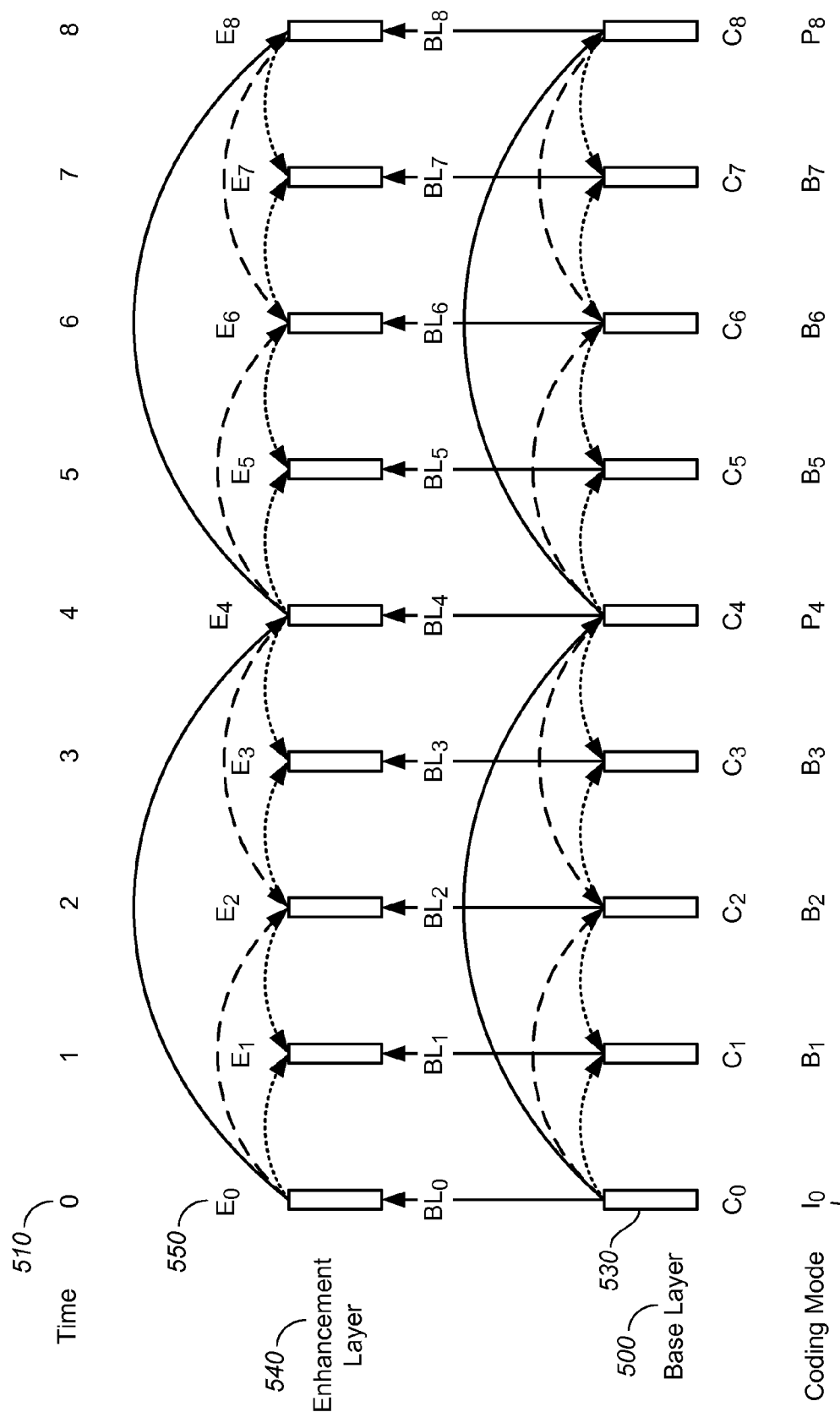
FIG. 5 shows an exemplary diagram of coding dependencies between enhancement and base layer.
Figure 9:
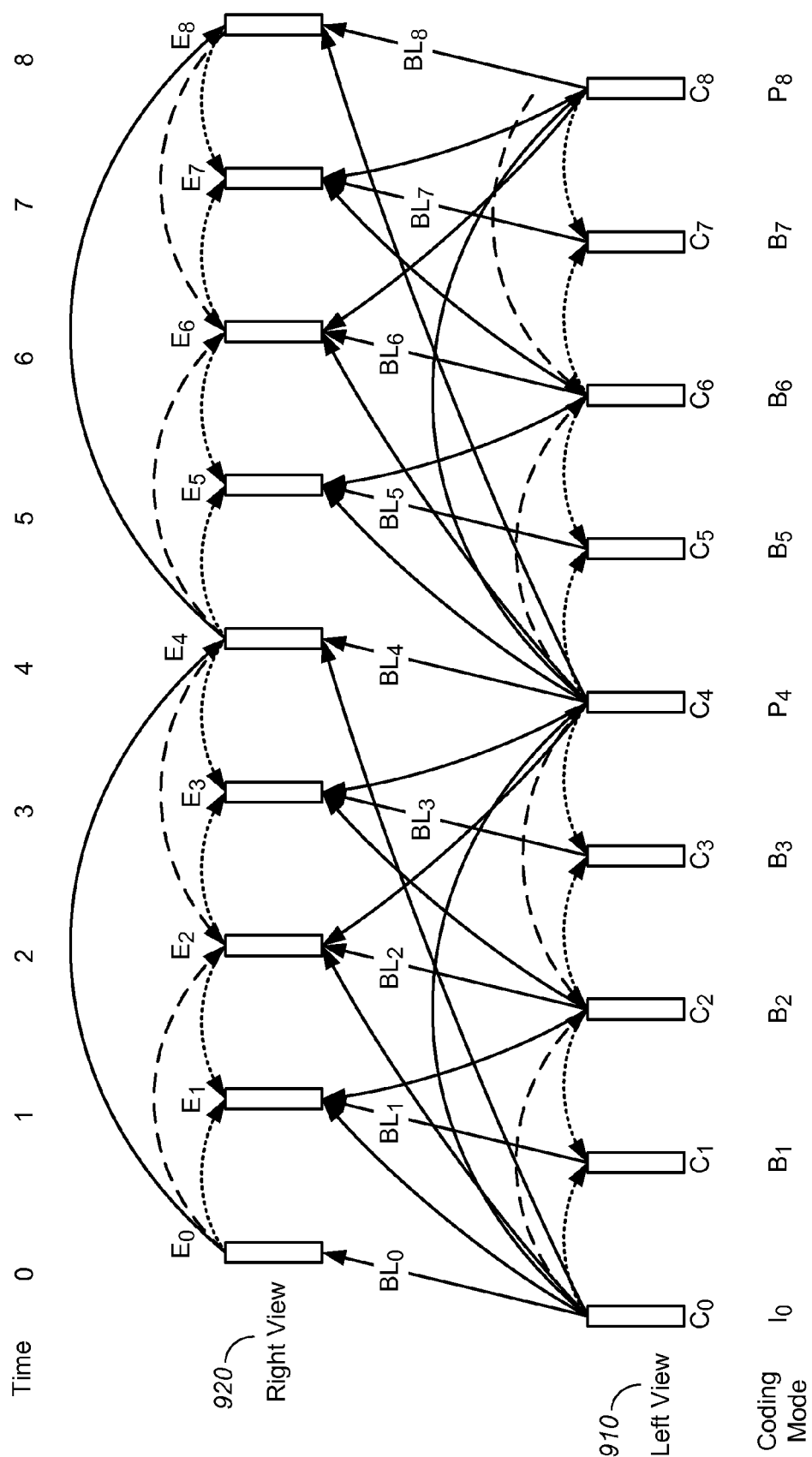
FIG. 9 shows an exemplary diagram of coding dependencies in a 3D system between enhancement and base layer.

Another possible method to consider inverse mapping within existing frameworks for motion compensated prediction is to add the base layer images as additional prediction references within available reference prediction lists. A base layer image is assigned one or multiple reference indices within each available list (e.g., LIST_0 and LIST_1) and also associated with a different inverse mapping process. Specifically, FIG. 5 shows the coding structure of the base layer (500) where the picture at time t=0 (510) (denoted $C_0$) is intra encoded ($I_0$) (520). The picture $C_0$ (530) can be used to predict the enhancement layer (540) using inverse mapping when it is desired to synchronize decoding of the base and enhancement layer. Specifically, this prediction can be accomplished by encoding the enhancement layer picture $E_0$ (550) as an inter coded (P or B) picture, and adding $C_0$ as a reference within the available list. FIG. 9 shows the coding structure of FIG. 5 in a 3-D system between a left view (910), used as the base layer, and a right view (920), used as the enhancement layer.

Assuming that two different inverse mapping tables or methods are sufficient to predict $E_0$, then using reordering or reference picture list modification commands, $C_0$ can be added as a reference with indices 0 and 1 in the LIST_0 reference list, and each of the two mapping tables can then be assigned to $C_0$. Motion estimation and compensation can then be performed using the two references for prediction. As an additional example, for the encoding of $E_1$; $E_0$, $E_2$, and $C_1$ can be considered for prediction. $C_1$ can be placed as a reference in both LIST_0 and LIST_1 reference lists as reference with index 0, and $E_0$ and $E_1$ placed in LIST_0 and LIST_1 respectively, with index 1. Note that in such scenario, bi-prediction can result in combinations of different inverse mapping tables or methods as described previously. Motion estimation can be performed from the base layer to the enhancement layer to potentially provide additional performance benefits. Such concepts are reminiscent of fractal encoding as described in references [16] and [17].

Figure 11:
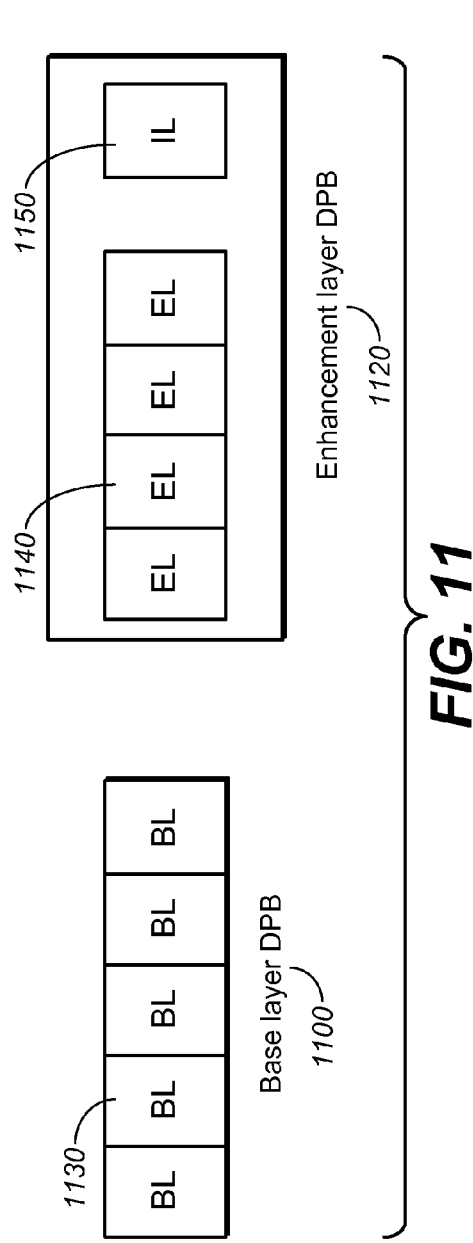
FIG. 11 shows exemplary decoded picture buffers (DPBs) of a base layer and an enhancement layer.

FIG. 11 shows exemplary decoded picture buffers (DPBs) of a base layer and an enhancement layer. The base layer DPB (1100) comprises previously decoded base layer pictures (1130) (or previously decoded regions of base layer pictures). The enhancement layer DPB (1120) comprises previously decoded enhancement layer pictures (1140) (or previously decoded regions of enhancement layer pictures) as well as inter-layer reference pictures (1150). Specifically, the RPU can create one or more inter-layer reference pictures given certain mapping criteria, which are specified in the RPU syntax that can then be used for predicting the enhancement layer.

Figure 12A:
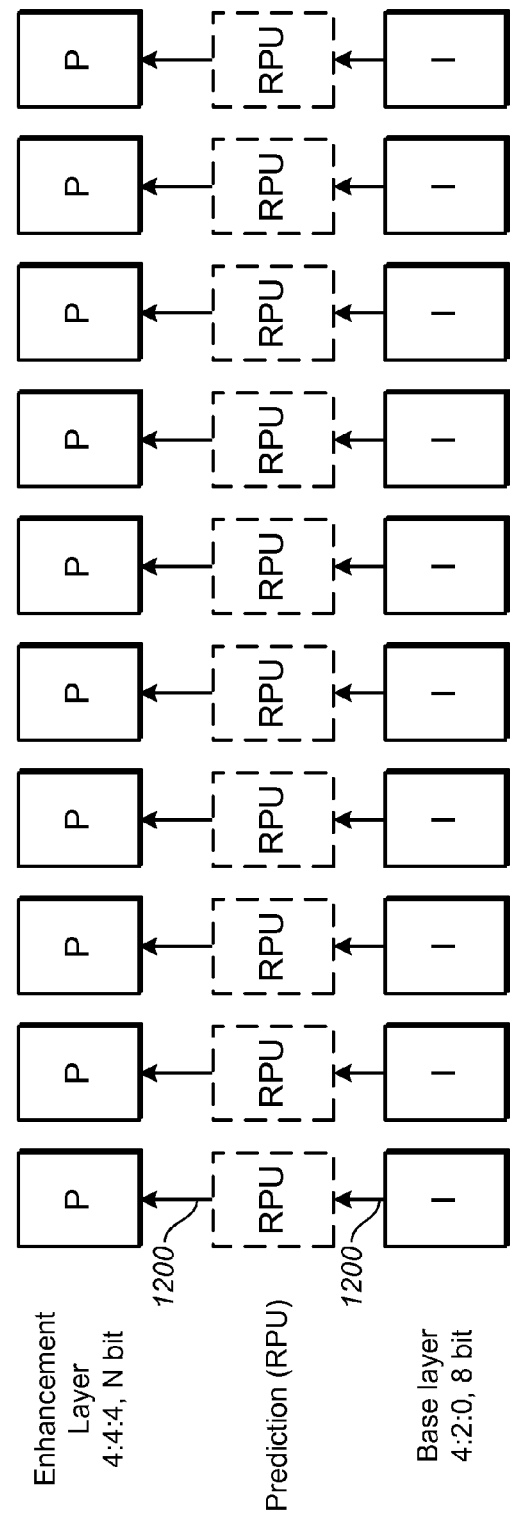
FIG. 12A shows an exemplary diagram of coding dependencies involving inter-layer and intra-layer prediction.
Figure 12B:
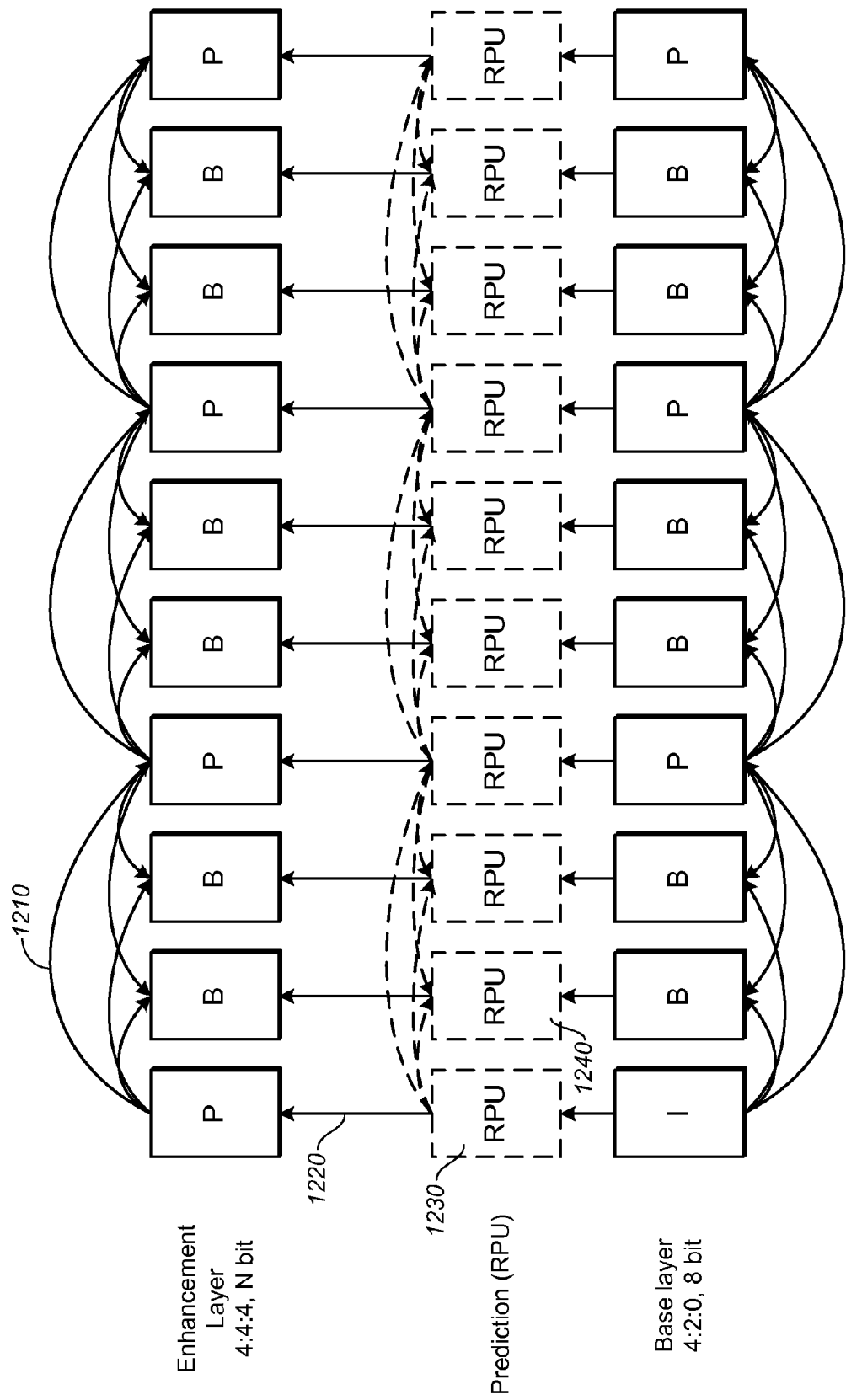
FIG. 12B shows an exemplary diagram of coding dependencies involving inter-layer, intra-layer and temporal prediction.
Figure 14A:
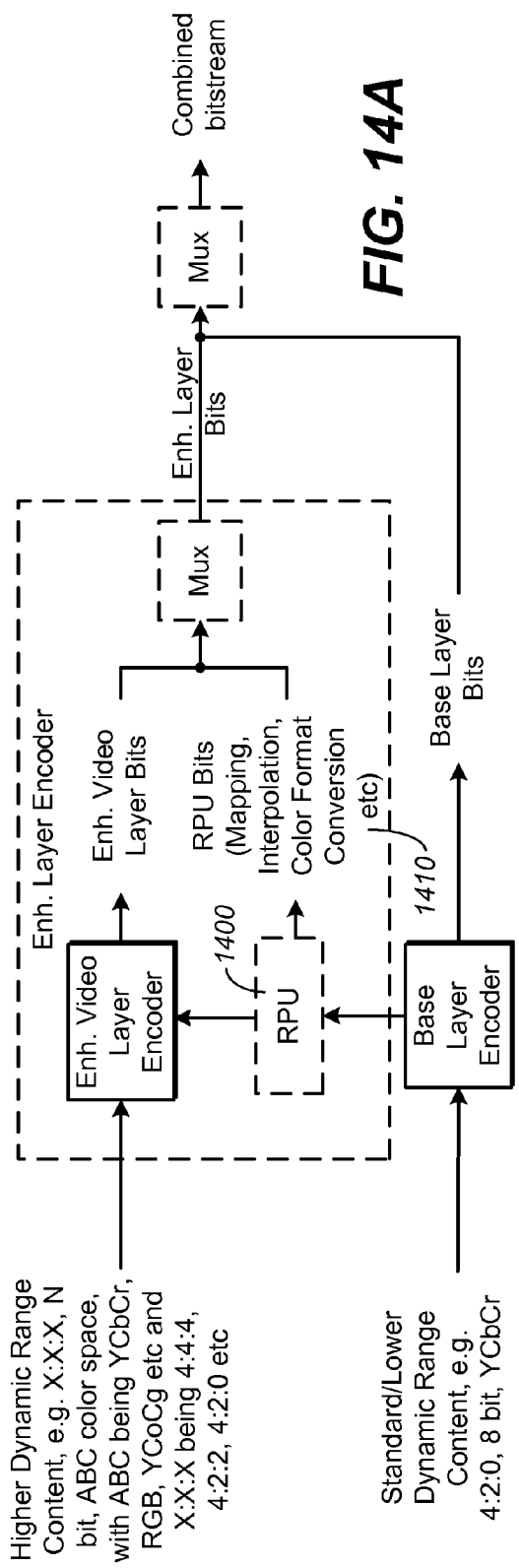
FIGS. 14A-14B show an exemplary prediction method from the base layer to the enhancement layer using a reference processing (RPU) unit element in an encoder and a decoder.
Figure 14B:
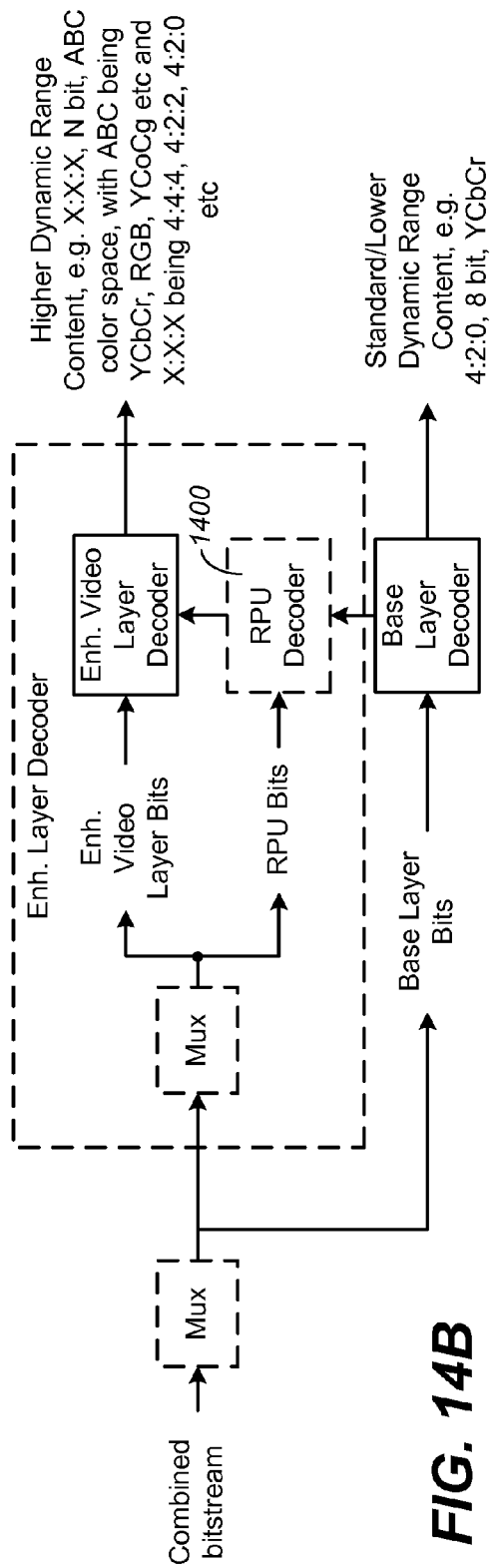

By way of example and not of limitation, the RPU (1400) can contain information of how an entire picture, or regions within a picture, can be mapped (1410) from one bit depth, color space, and/or color format to another bit depth, color space, and/or color format as shown in FIGS. 14A-14B. Information contained in the RPU on one region of a picture can be used to predict other regions in the same RPU as well as predict regions in another RPU. FIG. 12A shows an exemplary diagram of coding dependencies involving inter-layer prediction (1200), where inter-layer references within a DPB can be used for prediction of the enhancement layer from the base layer. FIG. 12B shows another exemplary diagram of coding dependencies involving inter-layer prediction (1220) and temporal prediction (1210). In addition to those coding dependencies shown in FIG. 12A, temporal prediction (1210) and samples previously reconstructed from previously decoded pictures can also be utilized in prediction. Additionally, information concerning one picture or region of a picture within one RPU (1230) can be utilized in prediction of a picture or region of a picture within another RPU (1240).

Figure 6:
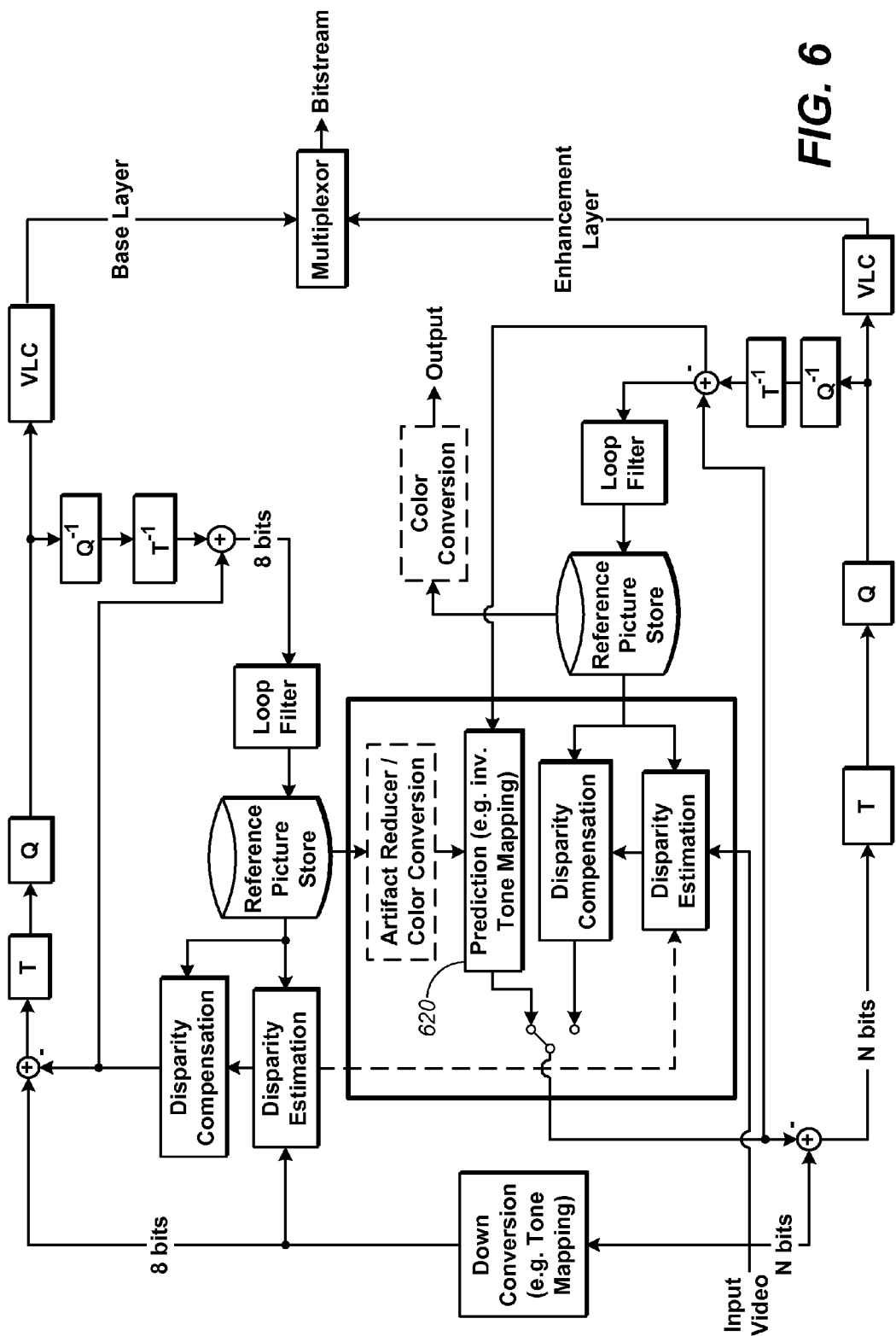
FIG. 6 shows an exemplary bit-depth scalable encoder with color space conversion.

A coding scheme such as that shown in FIG. 6 can be used for encoding of the enhanced content in the enhancement layer. Although such a coding scheme may appear similar to those described in reference [13], several enhancements are introduced in various elements of the system in the present disclosure, including the inverse mapping process (620), motion compensation, residual coding, and other components.

Figure 7:
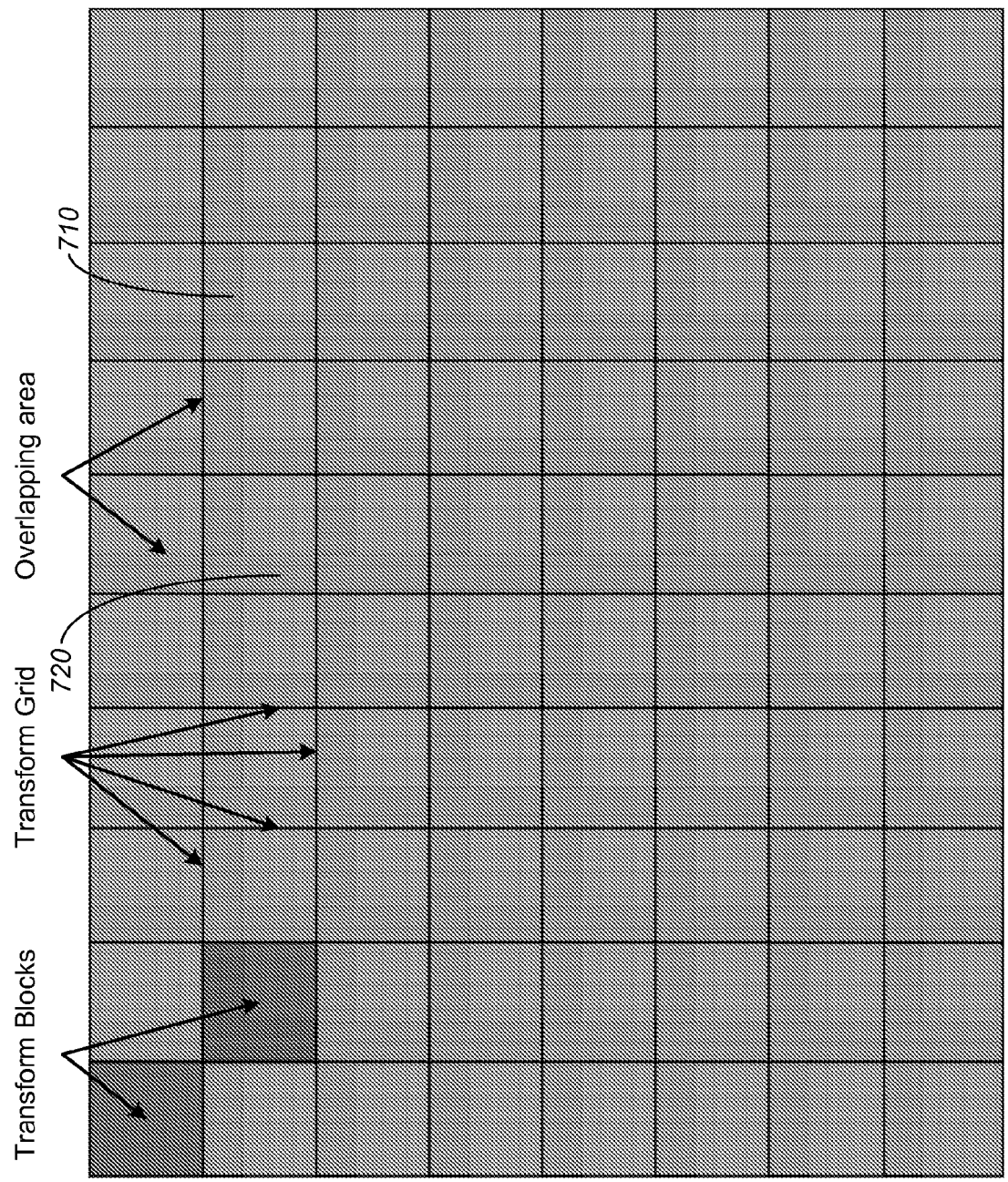
FIG. 7 shows an exemplary Overlapped Block Motion Compensation (OBMC) consideration for inter prediction or inverse tone mapping.

In another embodiment of the present disclosure, additional concepts can be considered to further improve performance. For example, in U.S. patent application Ser. No. 13/057,204, a simpler architecture than the methods presented in reference [14] were identified for performing Overlapped Block Motion Compensation. This method can be extended to also consider inverse mapping. Prediction on the top (710) and left (720) boundaries of a block can be altered based on the coding parameters of its neighbors as shown in FIG. 7. If the current block uses weighted prediction parameters ($w_x$, $o_x$) to perform mapping from the base layer representation to the enhancement layer representation and the blocks on the top and left uses parameters ($w_T$, $o_T$) and ($w_L$, $o_L$) respectively, then samples on the left and top of this block can use weighting parameters in the form of:

$$(d_{x,w} \times w_x + d_{L,w} \times w_L + d_{T,w} \times w_T, d_{x,o} \times o_x + d_{L,o} \times o_L + d_{T,o} \times o_T),$$

where parameters d specify influence of each weight to the prediction process and relate to the sample distance from each neighbor. However, since OBMC can be complicated and expensive for inter prediction, benefits should be carefully evaluated to determine whether using OBMC is justifiable within the application.

In addition to high correlation between samples from the base and enhancement layers, high correlation can also exist within the motion of the base and enhancement layers. However, encoding decisions, for example, usage of Rate Distortion Optimization at the base layer, can result in suboptimal motion vectors for the enhancement layer. Furthermore, using motion vectors directly from the base layer can affect certain implementations, particularly in cases involving hardware, where existing decoding architectures may not be reusable due to different codecs being handled differently, since motion compensation is considered in that framework. Conversely, high correlation also exists between the motion vectors of adjacent macroblocks, while inverse mapping can be the dominant prediction mode in bit-depth scalability applications.

Similarly, correlation can exist between the multiple inverse mapping tables or mechanisms used for prediction as described in previous paragraphs. Specifically, correlation can exist between same values in different tables, or between a current value and its previously encoded neighbor. Although such parameters can be transmitted once per SPS, PPS, or slice header, or within another coding unit such as an RPU, efficient encoding of these parameters can result in some coding gain. For example, one inverse tone mapping method could be described as:

$$y=[((w+\epsilon_w) \times x+(1<<(N-1)))>>N]+(o+\epsilon_o),$$

where weighting parameters w and o only need to be signaled once, while $\epsilon_w$ and $\epsilon_o$ are signaled for every possible x value. N allows integer only operations for the inverse tone mapping process. Since the value of $\epsilon_w$ and $\epsilon_o$ is likely to be close to or equal to 0, they can be differentially encoded and then entropy encoded, ultimately resulting in fewer bits.

In another embodiment of the present disclosure, color conversion with the SVC framework can also be considered to encode HDR content in a way that the dynamic range of the content is retained while achieving the smallest possible loss in fidelity. The encoding process can be performed in any color space, aside from any color space constraints imposed on the base layer. Thus, the use of variable and dynamic color spaces for encoding can be implemented instead of fixing the color space for encoding of the enhancement layer in the present disclosure.

For every sequence, group of pictures (GOP), or every single picture or slice, Applicants can determine and use a color space transform which would lead to best coding efficiency. The color space transform that is applied to the base layer and the inverse color transform that is applied to the reconstructed image to achieve the appropriate HDR space can be signaled through the SPS, PPS, or for every slice header, or within a similar coding unit such as an RPU. This can be a preliminary transform process which best de-correlates the color components for compression purposes. The transform can be similar to existing transforms such as YUV to RGB or XYZ, but can also include nonlinear operations such as gamma correction.

Figure 8:
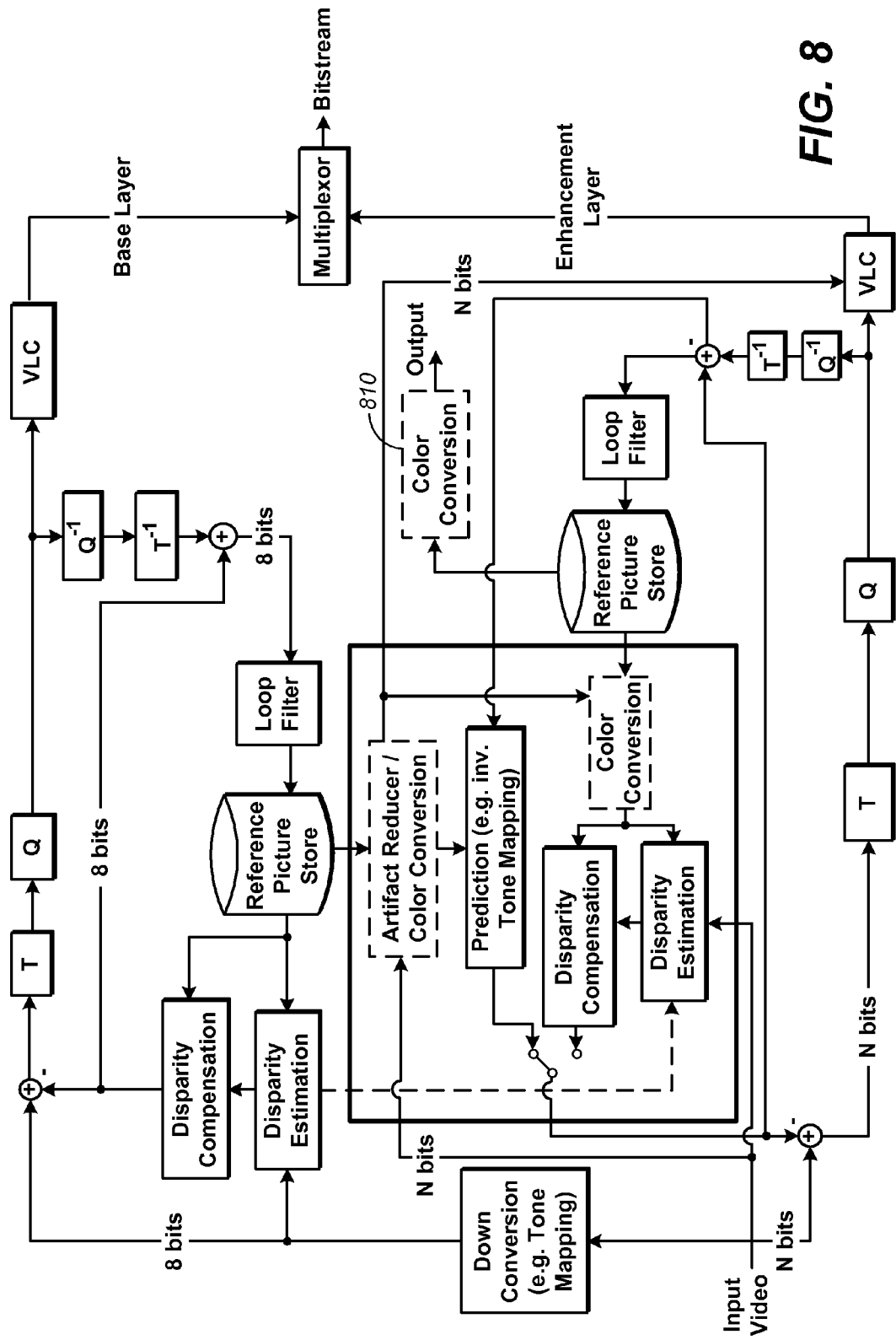
FIG. 8 shows an exemplary bit-depth scalable encoder with adaptive color space conversion.

The color transform can remain the same for a single video sequence, or can be changed and/or updated for every Instantaneous Intra Refresh (IDR) picture or at fixed or predefined intervals since the content characteristics are not likely to change rapidly. The conversion process (810) from, and to, any possible color space used by the pictures within the video bitstream may need to be specified if unknown to allow for predicting a picture of a certain color space $C_1$ with motion compensated prediction from pictures of a different color space $C_2$. An example of such process is shown in FIG. 8. Such a process can also be applicable to other applications such as encoding of infrared or thermal images, or other spaces where an original color space used for capture and/or representation may not provide the best color space for compression purposes.

As described in reference [15], encoding decisions within the base layer can affect the performance of the enhancement layer. Therefore, design aspects of normative tools within the system of the present disclosure are considered as well as methods to best design encoding and/or non-normative algorithms. For example, a system can reuse motion information for both base and enhancement layer when considering complexity decisions, while the design of joint algorithms for rate distortion optimization and rate control can result in improved performance for both layers. In particular, a lagrangian optimization can be used for Rate Distortion Optimization by minimizing the equation:

$$J=w_{base} \times D_{base}+w_{enhanced} \times D_{enhanced}+R_{total},$$

where $w_{base}$ and $w_{enhanced}$ are the lagrangian parameters, $D_{base}$ and $D_{enhanced}$ are the distortion at each level, and $R_{total}$ is the total bitrate for encoding both layers. Such a process can be extended to take into account encoding of multiple pictures considering interdependencies that can exist in between the pictures. Distortion can be based on simple metrics such as, for example, the Sum of Square Errors (SSE), Sum of Absolute Differences (SAD), Structure Similarity Index Metric (SSIM), Weighted SSE, Weighted SAD, or Sum of Transformed Absolute Differences (STAD). However, different distortion metrics can also be considered to satisfy the human visual model, or for display of content on a certain display device.

Alternatively, decisions can be made for both layers for rate control/quantization, including selection of quantization parameters, adaptive rounding or trellis optimization of coded coefficients so as to satisfy all bitrate target requirements that may have been imposed while achieving best possible quality. Mode decision and/or motion parameter trellis can also be applied to determine affine parameters using, for example, a True Motion Estimation (TME) method.

Figure 10:
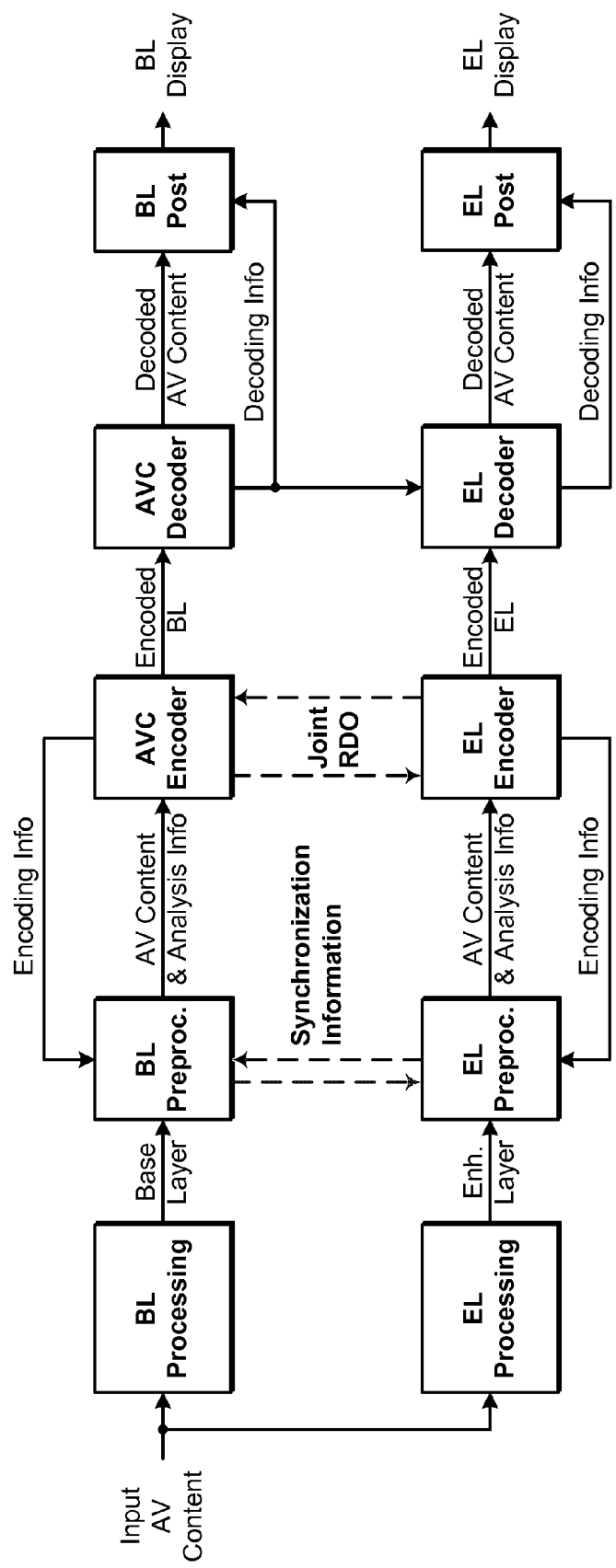
FIG. 10 shows an exemplary block diagram of encoding and decoding dependencies for bit-depth scalability.
Figure 13A:
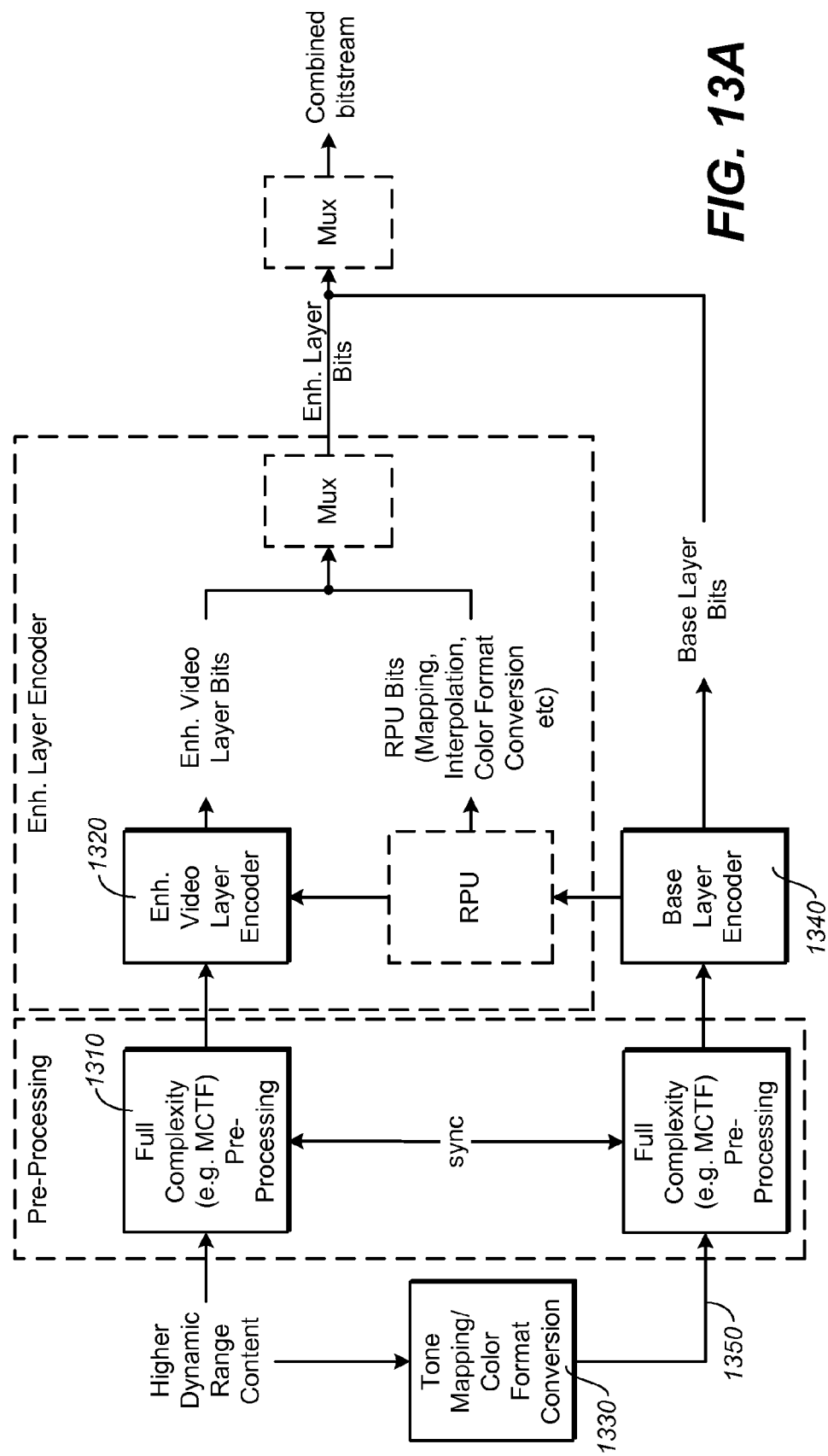
FIGS. 13A-13B shows a complex prediction structure that includes prediction of RPU information from one RPU to a next RPU.
Figure 13B:
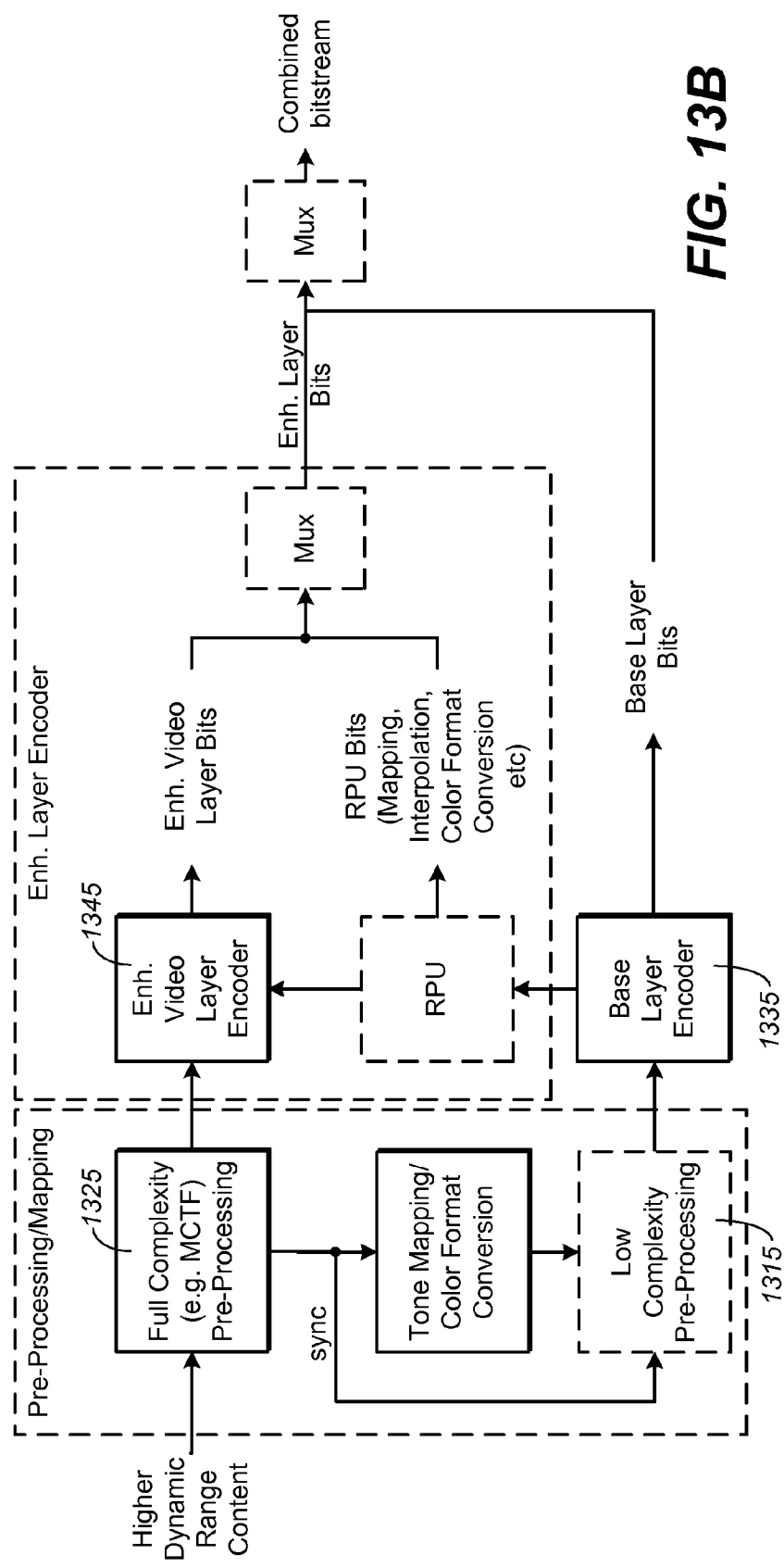

Encoding performance and subjective quality can be affected by consideration of pre-processing algorithms. Pre-processing methods as shown in FIGS. 10, 13A, and 13B, attempt to remove information prior to encoding that is likely to be removed during the encoding process (e.g., noise) but are not constrained by syntax and constraints of the codec. Such methods can result in improved spatial and temporal correlation of the signal to be compressed, resulting in improved subjective quality.

FIG. 13A shows an exemplary encoder system involving enhancement layer pre-processing. Higher bit depth content input into the enhancement layer can be processed using, for example, motion compensated temporal filtering (MCTF) (1310) to produce pre-processed enhancement layer pictures. In FIG. 13A, these pre-processed enhancement layer pictures serve as inputs to an enhancement layer encoder (1320) and a tone mapping and/or color conversion module (1330) (for tone mapping and/or color converting from the enhancement layer to the base layer). Base layer pictures, formed from information from the original higher bit depth content (1350) and the pre-processed enhancement layer pictures, can then be input into a base layer encoder (1340).

In the exemplary encoder system of FIG. 13B, synchronization of the pre-processor is not necessarily required since the pre-processing that is applied to both the base layer encoder (1335) and the enhancement layers encoder (1345) take place in the enhancement layer pre-processor. In such cases, complex pre-processing methods by way of filters such as MCTF can be utilized. FIG. 13B shows an encoder system comprising an additional, optional pre-processor (1315) in the base layer. This pre-processing takes place after the first pre-processing (1325) in the enhancement layer. Since the pre-processing in this case is not synchronized, the complexity of this additional pre-processing is constrained to further pre-processing based on information from the pre-processing method performed for the first layer, or limited to low complexity filters such as spatial filters that will not introduce or will introduce limited/controlled desynchronization.

An MCTF can be described specifically, such that a frame 2 (at $t_2$) can be predicted using reference pictures from the past ($t_0$, $t_1$), current ($t_2$), or/and future ($t_3$, $t_4$). Predictions $t_{20}$, $t_{21}$, $t_{22}$, $t_{23}$, and $t_{24}$ (where, for example, $t_{21}$, denotes a prediction of a frame 2 using information from frame 1) can be used to remove noise by utilizing temporal information and form a final prediction for $t_2$.

For scalable systems, joint pre-processing considerations for the base and enhancement layers can be used to eliminate cases which can be difficult to predict from, and also increase layer correlation, which can result in improved coding efficiency. Pre-processing can be particularly useful when using less efficient codecs, such as MPEG-2. As an example, in 3D systems, pre-processing can help eliminate camera color misalignment issues and noise that may have been introduced on each view. Similar considerations can also apply to post-processing. The tools that have been used for content creation, such as, pre-processing, and encoding, can be used, given a specific display device, to select different post-processing methods for each layer. Such methods can be signaled either through external mechanisms (e.g., SEI message or directly through the bitstream as in U.S. patent application Ser. No. 12/999,419. FIG. 10 shows the dependencies that can exist within an entire encoding (preparation) and decoding (delivery) chain of enhanced content.

The methods and systems described in the present disclosure may be implemented in hardware, software, firmware or combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), or a field programmable logic array (FPGA)).

The examples set forth above are provided to give those of ordinary skill in the art a complete disclosure and description of how to make and use the embodiments of the pre-processing for bitdepth and color format scalable video coding of the disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] *Advanced Video Coding for Generic Audiovisual Services*, ITU-T Rec. H.264 and ISO/IEC 14496-10 (MPEG-4 AVC), ITU-T and ISO/IEC JTC 1, Version 1: May 2003, Version 2: May 2004, Version 3: March 2005, Version 4: September 2005, Version 5 and Version 6: June 2006, Version 7: April 2007, Version 8 (including SVC extension): Consented in July 2007, http://www.itu.int/rec/recommendation.asp?type=folders&lang=e&parent=T-REC-H.264.

[2] A. Smolic, K. Mueller, N. Stefanoski, J. Ostermann, A. Gotchev, G. B. Akar, G. Triantafyllidis, and A. Koz, "Coding Algorithms for 3DTV—A Survey," in *IEEE Transactions on Circuits and Systems for Video Technology*, vol. 17, no. 11, pp. 1606-1621, November 2007.

[3] Y. Gao and Y. Wu, "Applications and Requirement for Color Bit Depth Scalability," Joint Video Team, Doc. JVT-U049, Hangzhou, China, October 2006.

[4] M. Winken, H. Schwarz, D. Marpe, and T. Wiegand, "SVC bit depth scalability," Joint Video Team, Doc. JVT-V078, Marrakech, Morocco, January 2007.

[5] R. Mantiuk, A. Efremov, K. Myszkowski, and H. P. Seidel, "Backward Compatible High Dynamic Range MPEG Video Compression," in Proc. of SIGGRAPH '06 (Special issue of ACM Transactions on Graphics), 25 (3), pp. 713-723, 2006.

[6] R. Mantiuk, G. Krawczyk, K. Myszkowski, and H. P. Seidel, "High Dynamic Range Image and Video Compression—Fidelity Matching Human Visual Performance," in Proc. of IEEE International Conference on Image Processing 2007, pp. 9-12.

[7] G. Ward, and M. Simmons, "JPEG-HDR: A Backwards-Compatible, High Dynamic Range Extension to JPEG," Proceedings of the Thirteenth Color Imaging Conference, November 2005.

[8] G. Ward, "A General Approach to Backwards-Compatible Delivery of High Dynamic Range Images and Video," Proceedings of the Fourteenth Color Imaging Conference, November 2006.

[9] A. Segall and Y. Su, "System for bit-depth scalable coding," Joint Video Team, Doc. JVT-W113, San Jose, Calif., April 2007.

[10] Y. Wu and Y. Gao, "Study on Inter-layer Prediction in Bit-Depth Scalability," Joint Video Team, JVT-X052, Geneva, Switzerland, June 2007.

[11] M. Winken, H. Schwarz, D. Marpe, and T. Wiegand, "CE2: SVC bit-depth scalability," Joint Video Team, JVT-X057, Geneva, Switzerland, June 2007.

[12] S. Liu, A. Vetro and W.-S. Kim, "Inter-layer Prediction for SVC Bit-Depth Scalable Coding," Joint Video Team, JVT-X075, Geneva, Switzerland, June 2007.

[13] Y. Ye, H. Chung, M. Karczewicz, and I. S. Chong, "Improvements to Bit Depth Scalability Coding," Joint Video Team, JVT-Y048, Shenzhen, China, October 2007.

[14] M. T. Orchard and G. J. Sullivan, "Overlapped block motion compensation: an estimation-theoretic approach," IEEE Trans. on Image Processing, vol. 3, no. 5, pp. 693-699, September 1994.

[15] H. Schwarz and T. Wiegand, "R-D optimized multilayer encoder control for SVC," in Proceedings of the IEEE International Conference on Image Processing (ICIP) 2007, San Antonio, Tex., September 2007.

[16] M. F. Barnsley and L. P. Hurd, Fractal Image Compression, A K Peters, Ltd., Wellesley, 1993.

[17] N. Lu, Fractal Imaging, Academic Press, USA, 1997.

The invention claimed is:

1. A method of processing input video data comprising:
receiving a first input of video data;
generating a second input of video data by tone mapping and color formatting the first input of video data, wherein the second input of video data is generated based on the first input and has a lower dynamic range than the first input;
pre-processing the first input video data with a first Motion Compensated Temporal Filter (MCTF) to generate a first pre-processed signal;
pre-processing the second input video data with a second Motion Compensated Temporal Filter (MCTF) to generate a second pre-processed signal;
encoding the second pre-processing signal using a base layer encoder to generate a base layer stream; and
encoding the first pre-processing signal using an enhancement layer encoder to generate an enhancement layer stream.

2. The method of claim 1, wherein encoding the first pre-processed signal using an enhancement layer encoder is based on both the first pre-processed signal and the second pre-processed signal.

3. The method of claim 1 wherein the base layer stream and the enhancement layer stream are multiplexed to generate a combined output bitstream.

4. A method of processing input video data, the method comprising:
providing a base layer and at least one enhancement layer;
providing a pre-processing unit, the pre-processing unit including at least a Motion Compensated Temporal Filter (MCTF) and a tone mapping and color format conversion function block, wherein the tone mapping and color format conversion function block is arranged downstream the Motion Compensated Temporal Filter;
applying the input video data to the pre-processing unit the base layer and the at least one enhancement layer for generating first and second pre-processed data, the first pre-processed data including MCTF-filtered video input data and the second pre-processed data including the MCTF-filtered video input data subsequently tone-mapped and color converted from the at least one enhancement layer to the base layer;
applying the first pre-processed data to an enhancement layer encoder of the at least one enhancement layer to generate an enhancement layer stream; and
applying the second pre-processed data to a base layer encoder of the base layer to generate base layer stream.

5. The method according to claim 4, wherein the pre-processing unit includes a further pre-processing function block arranged downstream the tone mapping and color format conversion function block such that the second pre-processed data are further pre-processed by the further pre-processing function block before applying to the base layer encoder, wherein the further pre-processing function block includes a spatial filter having constrained complexity relative to the Motion Compensated Temporal Filter (MCTF).

6. A system for processing input video data, comprising:
a base layer and at least one enhancement layer of a video encoding system;
a tone-mapping and a color-format-converting unit for receiving the input video data and providing the tone-mapped respectively color-formatted input video data to the base layer;
first and second Motion Compensated Temporal Filters (MCTF) for pre-processing the input video data in the enhancement layer and the color-formatted input video data respectively in the base layer, wherein said pre-processing by the first and second Motion Compensated Temporal Filters is performed in sync; and
encoding said respectively pre-processed video data in the at least one enhancement layer and the base layer.

7. A system for processing input video data, comprising: a base layer and at least one enhancement layer of a video encoding system; a pre-processing unit for receiving the video input data and including at least a Motion Compensated Temporal Filter (MCTF) and a tone mapping and color format conversion function block, wherein the tone mapping and color format conversion function block is arranged downstream the Motion Compensated Temporal Filter, wherein the pre-processing unit is adapted to generate first and second pre-processed data, the first pre-processed data including MCTF-filtered video input data and the second pre-processed data including the MCTF-filtered video input data subsequently tone-mapped and color converted from the at least one enhancement layer to the base layer; an enhancement layer encoder for receiving the first pre-processed data; and a base layer encoder for receiving the second pre-processed data.

8. The method according to claim 4, wherein the pre-processing unit includes a further pre-processing function block arranged downstream the tone mapping and color format conversion function block such that the second pre-processed data are further pre-processed by the further pre-processing function block before being received by the base layer encoder, wherein the further pre-processing function block includes a spatial filter having constrained complexity relative to the Motion Compensated Temporal Filter (MCTF).

9. The method according to claim 1, wherein the MCTF filter comprises a prediction filter, the prediction filter generating a predictor of a current frame based on past and future reference pictures.

10. The method according to claim 1, wherein pre-processing the first input video data with the first MCTF comprises selecting, for each macroblock of the first input video data, a coding mode selected from the group consisting of: base layer prediction with inverse mapping, base layer prediction with inverse mapping based on relationships between base layer and enhancement layer, base layer skip, inter-layer prediction, inter-layer skip mode, bi-prediction, intra-prediction, combined intra-prediction and inter-prediction, combined intra-prediction, base layer prediction and inter-prediction, and combined intra-prediction and base layer prediction.

11. The method according to claim 1, further comprising syncing the first MCTF with the second MCTF.

12. The method according to claim 1, wherein pre-processing the first input video data with the first MCTF comprises configuring the first MCTF so that a frame can be predicted from past, present and future frames.

13. The method according to claim 1, wherein pre-processing the first input video data with the first MCTF comprises increasing layer correlations and increasing coding efficiency.

14. The method according to claim 13, wherein increasing coding efficiency comprises reducing camera color misalignments.

* * * * *